United States Patent
Kageyama

(10) Patent No.: US 8,265,287 B2
(45) Date of Patent: Sep. 11, 2012

(54) ELECTRO-MECHANICAL TRANSDUCER AND MANUFACTURING METHOD OF THE SAME

(75) Inventor: Kensuke Kageyama, Kita-ku (JP)

(73) Assignee: National University Corporation Saitama University, Saitama-shi (JP)

( * ) Notice: Subject to any disclaimer, the term of this patent is extended or adjusted under 35 U.S.C. 154(b) by 911 days.

(21) Appl. No.: 12/298,428

(22) PCT Filed: Apr. 26, 2007

(86) PCT No.: PCT/JP2007/059041
§ 371 (c)(1), (2), (4) Date: Oct. 24, 2008

(87) PCT Pub. No.: WO2007/125985
PCT Pub. Date: Nov. 8, 2007

(65) Prior Publication Data
US 2009/0202083 A1   Aug. 13, 2009

(30) Foreign Application Priority Data
Apr. 27, 2006 (JP) ................ 2006-124251

(51) Int. Cl.
*H04R 29/00* (2006.01)
(52) U.S. Cl. ............ 381/59; 381/174; 381/191
(58) Field of Classification Search ........ 381/58, 381/59, 174, 175, 191
See application file for complete search history.

(56) References Cited

U.S. PATENT DOCUMENTS

| | | | | |
|---|---|---|---|---|
| 3,943,387 A * | 3/1976 | Veith | ........... | 310/358 |
| 6,978,029 B1 * | 12/2005 | Ikeda | ........... | 381/111 |
| 2005/0058298 A1 * | 3/2005 | Smith | ........... | 381/67 |

FOREIGN PATENT DOCUMENTS

| | | |
|---|---|---|
| JP | 2004-135223 | 4/2004 |
| JP | 2006-041575 | 2/2006 |
| JP | 2006-050314 | 2/2006 |
| JP | 2006-225203 | 8/2006 |

OTHER PUBLICATIONS

Office Action issued May 10, 2011, in Japanese Patent Application No. 2006-124251 with English translation.

* cited by examiner

*Primary Examiner* — Minh-Loan T Tran
*Assistant Examiner* — Fazli Erdem
(74) *Attorney, Agent, or Firm* — Oblon, Spivak, McClelland, Maier & Neustadt, L.L.P.

(57) ABSTRACT

A microphone-capsule includes a vibrator implemented by a conductor having a flat vibration surface, a dielectric-polarization plate that is defined by a flat first principal surface facing the vibration surface of the vibrating plate and a second principal surface facing parallel to the first principal surface and in which polarization directions are aligned, a back electrode joined to the second principal surface of the dielectric-polarization plate, and an induced-charge measuring unit configured to measure the charges induced between the vibrating plate and the back electrode, in association with the displacement of the vibration surface. The induced-charge measuring unit includes an amplifier connected to the back electrode and an output circuit connected to the amplifier.

12 Claims, 14 Drawing Sheets

(a)

(b)

(c)

(d)

(e)

OUTPUT

OUTPUT (a)

(b)

(c)

(d)

(e)

(a)

(b)

(c)

(d)

(e)

(f)

(a)

(b)

(c)

ELECTRO-MECHANICAL TRANSDUCER AND MANUFACTURING METHOD OF THE SAME

FIELD OF THE INVENTION

The present invention relates to an electro-mechanical transducer for converting a mechanical vibration into an electric signal, such as an electro-acoustic transducer and the like.

DESCRIPTION OF THE RELATED ART

A certain kind of a high polymer, such as polycarbonate and the like, has a property that, when a high electric field is applied from outside, charges induced onto a surface are quasi-permanently held. O. Heaviside coined the term "electret" for material in a state in which the charges are quasi-permanently maintained. As compared with a dynamic microphone having a structure in which a coil (voice coil) integrated with a vibrating plate is moved in a magnetic field, an electret condenser microphone (ECM) is designed such that the electret is arranged close and parallel to the vibrating plate. Then, when the vibrating plate is vibrated by sound, the distance from the electret is varied. Thus, the charged state of the electret is changed, and a sound signal can be extracted as an electric variation. However, since this signal is very small, this signal is amplified by a field effect transistor that is built in a microphone unit.

In order to improve the performance of the ECM, the electret quantity (polarization quantity) of the high polymer film is required to be increased. However, in a method of using a corona discharge and converting the high polymers into the electret, the remanent polarization quantity has a limit of about 30 $\mu C/m^2$. Also, the space between the electrodes of the ECM is required to be very clean. Thus, the manufacturing of the ECM is required to be carried out in the clean environment such as a clean room.

On the other hand, as a ferroelectric material, there is a material having the remanent polarization quantity, which is equal to or greater than 10,000 times that of the electret film. However, in order to use as the electret, there are a problem of a necessity of removing the charged particles adsorbed on the surface, and other problems.

SUMMARY OF THE INVENTION

As mentioned above, in the earlier technology, because the manufacturing process of the ECM was required to be carried out in the clean environment such as the dean room, there was a problem that the manufacturing cost of the ECM was expensive. Moreover, because the electret films, which are manufactured with corona discharge so as to maintain the space charges, had a problem that, when the electret films were used for a long time, the movement of the space charges could not be ignored, and the polarization quantity was deteriorated, there were problems in the stability of an operation and the heat-resistance property of the high polymer film used as the electrets. Moreover, since the electret quantity (polarization quantity) of the high polymer film was small, an amplifier and the like had to be built in. Hence, there was also a problem in miniaturization.

On the other hand, in order to use the ferroelectric material having very high remanent polarization quantity as the electret, there was a problem that the influence of the charged particles adsorbed on the surface had to be removed.

In view of the above-mentioned problems, an object of the present invention is to provide an electro-mechanical transducer having a high heat-resisting property and a high operational stability, which can be manufactured at low cost, and which facilitates miniaturization of size, and to provide a manufacturing method of the electro-mechanical transducer.

In order to achieve the above-mentioned object, an aspect of the present invention inheres in an electro mechanical transducer encompassing (a) a vibrator implemented by a conductor having a flat vibration surface, (b) a dielectric-polarization plate implemented by ferroelectric material, defined by a flat first principal surface facing to the vibration surface and a second principal surface facing parallel to the first principal surface, (c) a back electrode joined to the second principal surface, and (d) an induced-charge measuring unit configured to measure charges induced on the dielectric-polarization plate by displacement of the vibration surface. Here, term of "ferroelectric material" is slightly described. "Dielectric material" implies the electric insulator in which, when the electric field is applied to a substance, positive charges are pulled in a minus direction, and negative charges are pulled in a plus direction, and the polarization is generated. In the dielectric material, the substance in which a crystal structure does not have a symmetrical center (=has an asymmetrical structure), and ions are displaced, and the polarization is generated is referred to as "piezoelectric material". Among those piezoelectric materials, the substance that has a permanent dipole and involves an orientation polarization is referred to as "pyroelectric material". Moreover, in those pyroelectric materials, the substance in which the permanent dipole can be artificially inverted by the external electric field is referred to as "ferroelectric material" Thus, the ferroelectric material exhibits the pyroelectric property, the piezoelectric property and the dielectric property. Hence, the higher order generic concept of "ferroelectric material" is hierarchically indicated as follows:

dielectric>piezoelectic>pyroelectric>ferroelectic

In earlier technology, high polymer film used as electret is a type of material in which space charges are injected through corona discharge, and such high polymer film may be included in a category of the piezoelectric material, and a part of such high polymer mm manifests pyroelectric property. However, such high polymer film is not the ferroelectric material. The definition of "ferroelectric material" is as follows:

(a) The dielectric material that is spontaneously polarized (in a spontaneous polarization) even if the electric field is not applied from the outside.

(b) There is a hysteresis property in which the spontaneous polarization is inverted when the strong electric field is applied from the outside.

(c) There is the Curie temperature (Curie point) at which a structural transition from a higher temperature non-polar phase to a lower temperature polar phase occurs.

The ferroelectric material used in the electro-mechanical transducer according to an aspect of the present invention is mainly single-crystalline or poly-crystalline ferroelectric ceramic, and may includes some crystalline high polymer having the Curie temperature.

As the ferroelectric ceramic, it is possible to employ the following perovskite compound, tungsten bronze structure compound, bismuth-based layer-shaped structure compound, wurtzite (wurtzite type) structure crystal, zinc oxide, quartz, and Rochelle salt ($NaK(C_4H_4O_6)4H_2O$).

I. Perovskite Compound

I-1. Lead titanate ($PbTiO_a$)

remanent polarization; 0.2 $C/m^2$ $PbTiO_3$ thin film (hydrothermal synthesis):

remanent polarization; 1 C/m$^2$
Curie temperature; approximately 490° C.
I-2. Lead zirconate titanate (PZT)
remanent polarization; 0.15 to 0.7 C/m$^2$ (The values complicatedly change depending on the composition). Although the Curie temperature complicatedly change depending on the composition, the temperature lie generally in between 130 and 400° C. For example, in $Pb_{0.3}(TiO_3)_{0.7}$—$Pb_{0.7}(ZrO_3)_{0.3}$, the remanent SD polarization is 0.4 C/m$^2$, and the Curie temperature is 300° C., and in $Pb_{0.5}(TiO_3)$-$0.5Pb_{0.5}(ZrO_3)$, the remanent polarization is 0.5 C/m$^2$, and the Curie temperature is 360° C.
I-3. Lanthanum doped lead zirconate titanate (PLZT)
I-4. Barium titanate ($BaTiO_3$)
Curie temperature; approximately 130° C.
I-5. Lithium Niobate ($LiNbO_3$)
Curie temperature; approximately 1210° C.
II. Tungsten Bronze Structure Compound
II-1. Lead meta-niobate ($PbNb_2O_6$)
Curie temperature; approximately 570° C.
II-2. Bismuth tungstate ($Bi_2WO_6$)
Curie temperature; approximately 940° C.
remanent polarization; 0.02 C/m$^2$
III. Bismuth-Based Layer-Shaped Structure Compound
Bismuth lanthanum titanate (BLT) remanent polarization; 0.15 C/m$^2$), $Bi_4Ti_3O_{12}$ (remanent polarization; 0.4 C/m$^2$), $CaBi_4Ti_4O_{15}$ (remanent polarization; 25 C/m$^2$)
IV. Wurtzite (wurtzite type) structure crystal
V. Zinc Oxide (ZnO)
VI. Quartz ($SiO_2$)
Curie temperature; approximately 573° C.
VII. Rochelle salt ($NaK(C_4H_4O_6)4H_2O$)
On the other hand, as "some crystalline high polymer having the Curie temperature", it is possible to employ the following fluorine-based high polymer ferroelectric materials and the like.
I. Polyvinylidene fluoride (PVDF)
II. Vinylidene fluoride/vinylidene trifluoride copolymer single crystal
remanent polarization; 0.11 C/m$^2$
Curie temperature; approximately 120° C.
III. VDF oligomer
remanent polarization; 13 C/m$^2$
IV. Dihydroxy-p-benzoquinones (chloranilic acid)
remanent polarization; 8 mC/m$^2$ Another aspect of the present invention inheres in a manufacturing method of an electro-mechanical transducer, encompassing (a) on a dielectric-polarization plate implemented by a ferroelectric material, defined by a flat first principal surface and a second principal surface facing parallel to the first principal surface, joining a back electrode on the second principal surface of the dielectric-polarization plate, (b) heating the dielectric-polarization plate to a charge-neutralization temperature between a depolarization temperature and the Curie temperature so as to remove charges induced on a surface of the dielectric-polarization plate, (c) preparing a vibrator implemented by a conductor having a flat vibration surface, and accommodating the dielectric-polarization plate, the back electrode and the vibrator in a conductive case, at the charge-neutralization temperature so that the first principal surface faces to the vibrator, and then sealing a space between the vibrator and the dielectric-polarization plate, and (d) after sealing the space between the vibrator and the dielectric-polarization plate, returning the dielectric-polarization plate to room temperature. Here, "depolarization temperature" implies the temperature at which the polarization of the ferroelectric material (typically, the piezoelectric material) begins to be sharply decreased. The temperature at which the polarizations of the ferroelectric material (piezoelectric material) are perfectly extinguished is defined as "Curie temperature". However, in the actual industrial application, depolarization temperature is more important than the Curie temperature, from the viewpoint that a temperature at which a large number of the polarizations begins to be decreased is defined. The depolarization temperature is mainly in the range between 40 and 80% of the Curie temperature with respect to the Celsius degree. As for the depolarization temperature, usually, while the polarized sample is being slowly heated and the pyroelectric current is measured, the temperature at which a large quantity of a current sharply flows can be observed when the remanent polarizations extinguish. Thus, this temperature can be defined as the depolarization temperature, in many cases. For example, as exemplified on the following table 1, although the Curie temperature of barium titanate ($BaTiO_3$) is about 130° C., the depolarization temperature is 80° C. Also, although the Curie temperature of lead titanate ($PbTiO_3$) is about 490° C., the depolarization temperature is 300° C. Although the Curie temperature of lead zirconate titanate (PZT: $Pb_{0.5}(TiO_3)_{0.5}$—$Pb_{0.5}(ZrO_3)_{0.5}$) is 350° C., the depolarization temperature is 190° C.

TABLE 1

| material name | Curie temperature (° C.) | depolarization temperature (° C.) | (depolarization temperature)/(Curie |
|---|---|---|---|
| lead titanate | 490 | 300 | 61% |
| lead zirconate titanate (PZT) | 350 | 190 | 54% |
| barium titanate ($BaTiO_3$) | 130 | 80 | 62% |

Thus, it can be said that a number of the depolarization temperatures lie in the range between 50 and 70% of the Curie temperature with respect to the Celsius degree, and a further larger number of the depolarization temperatures lie in the range between 55 and 66% of the Curie temperature with respect to the Celsius degree. With "charge-neutralization temperature between depolarization temperature and Curie temperature", the upper limit of the charge-neutralization temperature is the Curie temperature. As the charge-neutralization temperature moves closer to the Curie temperature, the drop in the remanent polarization becomes greater. Thus, depending on the material, there is a possibility that the charge-neutralization temperature is set to be approximately equal to the Curie temperature. However, from a practical standpoint, even if the charge-neutralization temperature is set to the temperature that is lower than the Curie temperature by 10 to 20° C., if the charge-neutralization temperature is equal to or higher than the depolarization temperature, the effectiveness can be sufficiently expected. In a scheme for achieving processes under lower temperature, even if the charge-neutralization temperature is set to be within the range of the temperature lower than the Curie temperature by about 20° C., as far as the charge-neutralization temperature is equal to or higher than the depolarization temperature, the effectiveness of the present invention can be sufficiently expected.

According to the present invention, it is possible to provide an electro-mechanical transducer having a high heat-resisting property and a high operational stability, which can be manufactured at low cost, and which facilitates miniaturization of size, and it is possible to provide a manufacturing method of the electro-mechanical transducer.

DETAILED DESCRIPTION OF THE EMBODIMENTS

Figure 1:
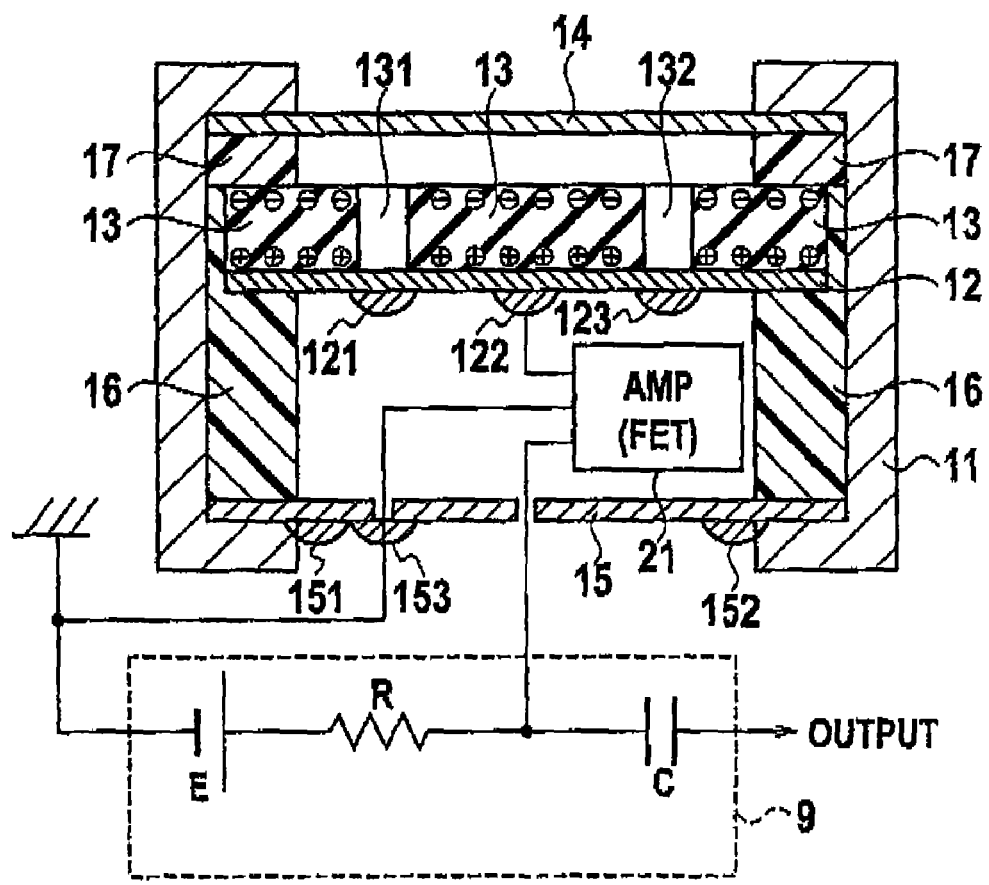
FIG. 1 is a diagrammatically sectional view that describes a schematic configuration of an electro-mechanical transducer (microphone-capsule) according to a first embodiment of the present invention.

The first to eighth embodiments of the present invention will be described below with reference to the drawings. In the following notifications on the drawings, the same or similar reference numerals are assigned to the same or similar parts and elements. However, the drawings are only diagrammatic. Then, attention should be paid to the fact that the relations between thicknesses and flat surface dimensions, the ratios between thicknesses of respective layers, and the like differ from the actual values. Also, the thicknesses, dimensions and the like of the respective layers, which are exemplified and described in the first to eighth embodiments, should not be limitedly construed, and the specific thicknesses and dimensions should be judged by considering the following explanations. In particular, attention should be paid to the fact that the thicknesses, dimensions and the like can be determined to various values, on the basis of the design policy indicated in the Eqs. (1) to (3) and the requested properties and specifications, which will be described later. Also, naturally, the portion in which the relations and ratios between the mutual dimensions are different is included even between the mutual drawings.

Also, the first and second embodiments, which will be described below, only example the apparatuses and methods to specify the technical idea of the present invention. As for the technical idea of the present invention, the material qualities, shapes, structures, arrangements and the like of the configuration parts are not limited to the followings. Various changes can be added to the technical idea of the present invention, within the technical range noted in claims.

First Embodiment

As shown in FIG. 1, the electro-mechanical transducer according to a first embodiment of the present invention is the microphone-capsule that contains: a vibrator (vibrating plate) 14 implemented by a conductor having a flat vibration surface; a dielectric-polarization plate 13 which is defined by a flat first principal surface facing to the vibration surface of the vibrating plate 14 and a second principal surface facing parallel to the first principal surface and in which polarization directions are aligned; a back electrode 12 joined to the second principal surface of the dielectric-polarization plate 13; and an induced-charge measuring unit (21, 9) configured to measure the charges induced between the vibrating plate 14 and the back electrode 12, in association with the displacement of the vibration surface. Under no load, the first principal surface of the dielectric-polarization plate 13 faces parallel to the vibration surface of the vibrating plate 14. Here, the induced-charge measuring unit (21, 9) contains: an amplifier (FET) 21 connected to the back electrode 12; and an output circuit 9 connected to the amplifier (FET) 21. The output circuit 9 contains: a direct current power supply E whose one end is grounded; an output resistor R connected between the direct current power supply E and the amplifier (FET) 21; and a coupling capacitor C having one electrode connected to a connection node between the output resistor R and the amplifier (FET) 21 and the other electrode serving as an output terminal. An external circuit (not shown) is connected to the output terminal of the coupling capacitor C serving as the output terminal of the induced-charge measuring unit (21, 9). Then, the external circuit carries out signal processes necessary for a communicating apparatus and a recording apparatus that are connected to the microphone. The induced-charge measuring unit (21, 9) in the electro-mechanical transducer according to the first embodiment of the present invention measures the charges induced onto the dielectric-polarization plate 13, in association with the displacement of the vibration surface of the vibrating plate 14, because the amplifier (FET) 21 amplifies the potential between the back electrode 12 and the vibrating plate 14.

Although the illustrations of a plan view and a bird's eye view are omitted, each of the vibrating plate 14, the dielectric-polarization plate 13 and the back electrode 12 in the microphone-capsule shown in FIG. 1 has the shape of a circular plate whose radius is between 8 and 40 mm. As shown in FIG. 1, the dielectric-polarization plate 13 and the back electrode 12, which have the shapes of the circular plates, are sandwiched between a spacer ring 17 implemented by an insulator and a holder 16 implemented by a cylindrical insulator. The peripheral portion of the vibrating plate 14 having the shape of the circular plate is connected to the top end surface of the spacer ring 17. That is, the spacer ring 17 defines the interval between the vibrating plate 14 and the dielectric-polarization plate 13, which face parallel to each other. The thickness of the dielectric-polarization plate 13 can be selected as, for example, about 20 to 40 μm, and the thickness of the back electrode 12 can be selected as, for example, about 10 to 100 μm, and the thickness of the vibrating plate 14 can be selected as, for example, about 10 to 100 μm. However, the specific thicknesses and radiuses of the vibrating plate 14, the dielectric-polarization plate 13 and the back electrode 12 are determined on the basis of the design policy indicated in the Eqs. (1) to (3) which will be described later and the requested performances and specifications.

A bottom plate 15 implemented by a metallic circular plate having a wiring opening is connected to the bottom end surface of the holder 16. The bottom plate 15, the holder 16, the spacer ring 17 and the vibrating plate 14 are accommodated in a conductive (metallic) case 11 and implement the microphone-capsule. The conductive (metallic) case 11 and bottom plate 15 are connected through solders 151, 152. Also, the bottom plate 15 and a ground wiring from the FET 21 are connected through a solder 153 in the wiring opening of the bottom plate 15. The FET 21 is electrically connected to the back electrode 12 through a solder 122 that is melted so as to adhere around the center of the back electrode 12. Although through holes 181, 132 that penetrate through the back electrode 12 and the dielectric-polarization plate 13 are formed in the back electrode 12 and the dielectric-polarization plate 13, the through holes 131,132 are sealed by using solders 121, 123 so that as necessary, gas (insulating gas) having a high insulating property can be filled in the gap space between the dielectric-polarization plate 13 and the vibrating plate 14. As the insulating gas, it is possible to employ nitrogen, sulfur hexafluoride and the like. In addition to the insulating gas, even if the insulating fluid such as silicon oil and the like is filled in the gap space between the dielectric-polarization plate 13 and the vibrating plate 14, the dielectric breakdown strength is increased, which makes the generation of the discharge difficult. As a result, the quantity of the adsorbed charges on the surface of the dielectric-polarization plate 13, the charges arm generated by the discharging, can be decreased, thereby improving the sensibility. Instead of the filling the insulating gas or fluid, even if the gap space between the dielectric-polarization plate 13 and the vibrating plate 14 is evacuated into a vacuum state, the sensibility can be improved.

By the way, each of the vibrating plate 14, the dielectric-polarization plate 13 and the back electrode 12 is not required to have the shape of the circular plate. The vibrating plate 14, the dielectric-polarization plate 13 and the back electrode 12 may have another geometrical shape, such as an ellipse, a rectangle or the like. If the vibrating plate 14, the dielectric-polarization plate 13 and the back electrode 12 have another geometrical shape, naturally, the other members such as the conductive (metallic) case 11 and the like shall be designed so as to agree with the geometrical shapes of the vibrating plate 14, the dielectric-polarization plate 13 and the back electrode 12.

The electro-mechanical transducer (microphone-capsule) according to the first embodiment of the present invention differs from earlier microphone-capsules in which high polymer films are used as the electrets, in that the ferroelectric material whose remanent polarization quantity is great is used as the dielectric-polarization plate 13. The remanent polarization quantity of the ferroelectric material is much greater than that of the high polymer film (a maximum of about 50 $\mu C/m^2$) used as the electret in the earlier technology. The high polymer films used as the electret in the earlier technology are films in which space charges are injected through corona discharge, and the high polymer films are classified into the category of piezoelectric material lying in the higher order generic concept of the ferroelectric material, and a part of the high polymer films represents pyroelectric properties.

As the ferroelectric material used in the dielectric-polarization plate 13 of the electro-mechanical transducer (microphone-capsule) according to the first embodiment, it is possible to employ the single-crystalline or poly-crystalline ferroelectric ceramic or the some crystalline high polymer having the Curie temperature, and the like, as already described in the section of SUMMARY OF THE INVENTION.

<Design of Electro-Mechanical Transducer>

The electrets used in the ECM capsule in the earlier technology are made of films in which space charges are injected through corona discharge, and the films are classified into the category of piezoelectric material, and a part of the films represents also pyroelectric properties. However, in the dielectric-polarization plate 13 implementing the electro-mechanical transducer (microphone-capsule) according to the first embodiment, the remanent polarization is required to be high so that the ferroelectric property rather than the piezoelectric property can be shown. For this reason, the design policy differs from the ECM capsule in the earlier technology.

Figure 2:
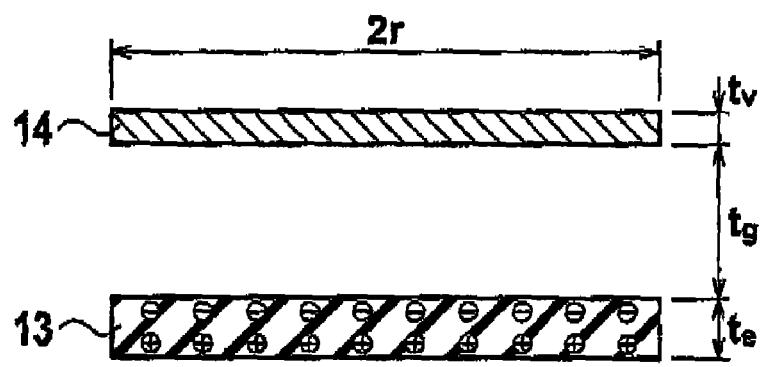
FIG. 2 is a diagrammatically sectional view describing design parameters of the electro-mechanical transducer according to the first embodiment of the present invention.

As shown in FIG. 2, when the thickness of the vibrating plate 14 is assumed to be $t_v$, the interval of the gap between the vibrating plate 14 and the dielectric-polarization plate 13 is assumed to be $t_g$, the thickness of the dielectric-polarization plate 13 is assumed to be $t_s$, and the radiuses of the vibrating plate 14 and the dielectric-polarization plate 13 are assumed to be r, by using the equation of capacitor circuit and the equation of beam deformation, an output v (V/Pa) per unit sound pressure is given by the following equation:

$$v = (E_{max}/4\sigma_{max})(\in_e t_g + \in_g t_e)/\in_e \quad (1)$$

Here, $\in_e$ is a dielectric constant of the dielectric-polarization plate 13, $\in_g$ is a dielectric constant of a medium field in the gap, $E_{max}$ is a dielectric breakdown strength (V/m), and $\sigma_{max}$ is a maximum allowable sound pressure. Here, the gap interval $t_g$ is designed to exhibit the following value.

$$t_g = (2a\sigma_{max}/S)(r^4/t_v^3) - (\in_g/\in_e)t_e \quad (2)$$

Here, S is an elastic modulus of the vibrating plate, and a is a shape coefficient. Also, here, a required remanent polarization $P_r(C/m^2)$ becomes the following value.

$$P_r = (E_{max}/2)(\in_e t_g + \in_g t_e/t_e) \quad (3)$$

The design example of the super small microphone-capsule whose thickness is 1 mm or less is shown on Table 2.

TABLE 2

| | |
|---|---|
| dielectric constant of dielectric-polarization plate $\in_e$ | 2000 |
| dielectric constant of gap $\in_g$ | 1 |
| thickness of dielectric-polarization plate $t_e$ (μm) | 200 |
| thickness of vibrating plate $t_v$ (μm) | 20 |
| radius of vibrating plate r(mm) | 5 |
| elastic modulus of vibratine plate S(GPa) | 1 |
| dielectric breakdown strength $E_{max}$(MV/m) | 5 |
| maximum allowable sound pressure $\sigma_{max}$(Pa) | 20 |
| maximum allowable sound pressure $\sigma_{max}$(dB) | 120 |
| shape coefficient a | 0.171 |
| interval of gap $t_g$(μm) | 267 |
| output per unit sound pressure v(V/Pa) | 16.7 |
| remanent polarization quantity Pr(C/m²) | 0.059 |

As shown on Table 2, when the thickness $t_e$ of the dielectric-polarization plate 13 is 200 μm, the interval $t_g$ of the gap is 267 μm, and the thickness $t_v$ of the vibrating plate 14 is 20 μm (the total of $t_e + t_g + t_v$ is 500 μm or less), it is possible to obtain the output per unit sound pressure of v=16.7 V/Pa that is dramatically great. Here, the required remanent polarization quantity $P_r$ is 0.059 C/m², and most of the ferroelectric ceramics have the remanent polarization quantity $P_r$ exceeding 0.059 C/m².

<Manufacturing Method of Microphone Capsule>

Figure 3:
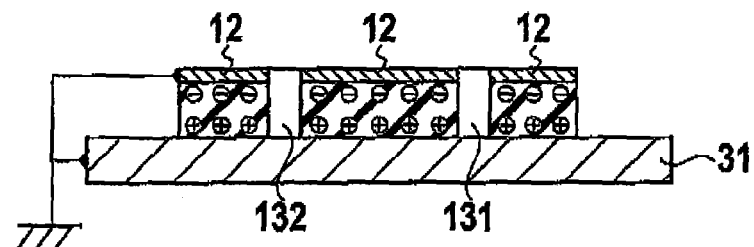
FIG. 3 is a diagrammatically sectional view describing the manufacturing method of the electro-mechanical transducer (microphone-capsule) according to the first embodiment of the present invention.
Figure 3:
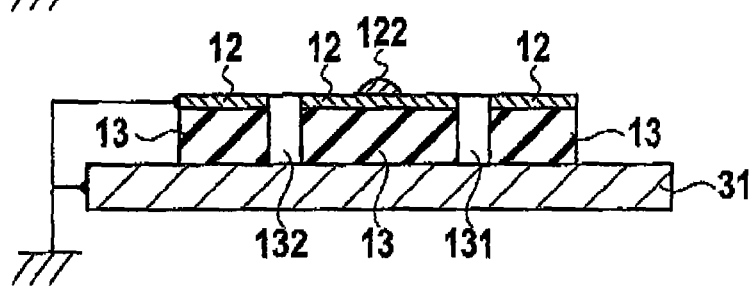
Figure 3:
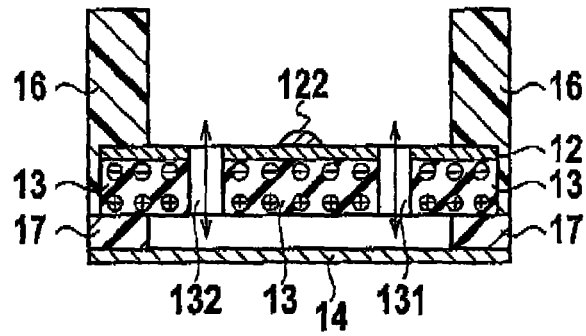
Figure 3:
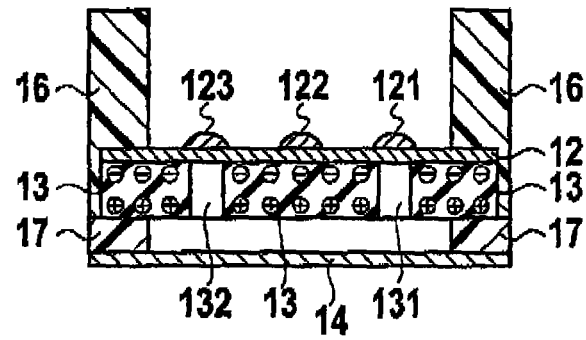
Figure 3:
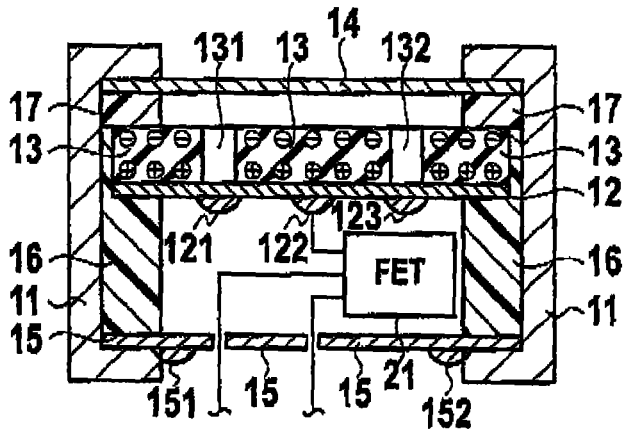

The electro-mechanical transducer (microphone-capsule) according to the first embodiment of the present invention will be described below with reference to FIG. 3. By the way, the manufacturing method of the electro-mechanical transducer (microphone-capsule) as described below is described as one example. Naturally, the manufacturing method of the electro-mechanical transducer can be achieved by using various manufacturing methods other than the procedure described below, including modifications of the procedure described below.

(a) A green body (powder compact) for the dielectric-polarization plate 13 having a shape of circular plate as a precursor is prepared, and through holes 131, 132 are opened so as to penetrate through the dielectric-polarization plate 13. The green body is sintered to obtain a ferroelectric sintered ceramic, and while the green body is being sintered, circular metallic plates are baked onto both surfaces of the dielectric-polarization plate 13, respectively. After that, the polarization process is performed. Only one side of the metallic plate (the baked electrode) remains as the back electrode 12. Alternatively, from the beginning, a single metallic plate (the baked electrode) is attached onto only one side serving as the back electrode 12, and the polarization process is performed. Furthermore, openings are formed in the metallic plate (the baked plate) on one side serving as the back electrode 12 so that the openings can be continuously connected to the through holes 131, 132 formed in the dielectric-polarization plate 13, before or after the metallic plate are baked. Then, the circular dielectric-polarization plate 13 on which the back electrode (baked electrode) 12 is attached at one side is placed on a metallic substrate 31, as shown in FIG. 3(a).

(b) Then, the dielectric-polarization plate 13 is heated to a charge-neutralization temperature (for example, between about 150° C. and about 300° C. in the case of the PZT), which is predetermined between the depolarization temperature and the Curie temperature of the dielectric-polarization plate 13. Then, as shown in FIG. 3(b), the remanent polarization of the dielectric-polarization plate 13 is decreased, and the surface charges are removed. Simultaneously, the solder 122 having a point similar to the heating temperature or slightly lower than the heating temperature is melted so as to adhere around the center of the back electrode 12. As scheduled to be explained in the sensibility recovering method of the electro-mechanical transducer (microphone-capsule) according to a fourth embodiment of the present invention, which will be described below, if the sensibility is desired to be recovered by re-annealing process, it is preferred to select a solder 122 having a melting point similar to the Curie temperature of the dielectric-polarization plate 13 or higher than the Curie temperature, such as the high melting point solder and the like (in this timing of removing the surface charges surface charges, the wirings that are scheduled to be connected to the FET 21 may be connected through the high melting point solders to the back electrode 12).

(c) An assembly (building block) encompassing a vibrating plate 14 implemented by metal (conductor) having a shape of circular plate and a spacer ring 17 made of insulator connected to the periphery of the vibrating plate 14 is prepared, and the dielectric-polarization plate 13 is attached on the assembly (building block). Moreover, as shown in FIG. 3(c), a holder 16 implemented by cylindrical insulator is connected such that the dielectric-polarization plate 13 and the back electrode 12 are sandwiched between the holder 16 and the assembly (building block). Simultaneously, as necessary, the gas (insulating gas) having a high insulating property is introduced into the gap space between the dielectric-polarization plate 13 and the vibrating plate 14. In this stage of the manufacturing process, the through holes 131, 182 serve as flow paths of the air or insulating gas.

(d) After that, the dielectric-polarization plate 13 is cooled to room temperature, and as shown in FIG. 3(d), the solders 121, 123 are used to bury the through holes 131, 132 and hermetically seal the portion between the vibrating plate 14 and the dielectric-polarization plate 13 (as explained in the sensibility recovering method of the electro-mechanical transducer according to the fourth embodiment of the present invention which will be described later, in a case that the sensibility is desired to be recovered by re-annealing process, by selecting solders 121, 123 having a melting point similar to the Curie temperature of the dielectric-polarization plate 13 or higher than the Curie temperature such as high melting point solder, before the dielectric-polarization plate 13 is cooled to room temperature, it is preferred that the solders 121, 123 shall bury the through holes 131, 132 so that the dielectric-polarization plate 13 can be cooled to room temperature thereafter). Moreover, the electronic parts such as FET 21 and the like are connected through the solder 122, and a bottom plate 15 implemented by a metallic circular plate having wiring openings is connected to the top end of the holder 16, and the holder 16 is accommodated in the conductive (metallic) case 11, as shown in FIG. 3(e) (such as the sensibility recovering method of the electro-mechanical transducer according to the fourth embodiment of the present invention which will be described later, if the sensibility is recovered by re-annealing process, electronic parts, such as the FET 21 and the like, which can endure the temperature between about 200° C. and about 300° C. is preferably selected). When the conductive (metallic) case 11 and the bottom plate 15 are connected through solders 151, 152 and also the bottom plate 16 and the ground wiring from the FET 21 are connected through a solder 153 in the wiring opening of the bottom plate 15, the microphone-capsule is completed as shown in FIG. 1.

As mentioned above, as for the dielectric-polarization plate 13, even if the polarization directions are aligned, the charged particles are adsorbed on its surface. Thus, the dielectric-polarization plate 13 cannot be used in its original state in the microphone-capsule according to the first embodiment. However, when the ferroelectric material is heated to the temperature close to the Curie temperature, the spontaneous polarization quantity is extremely decreased. For this reason, when the dielectric-polarization plate 13 made of the ferroelectric material together with the back electrode 12 is heated to the charge-neutralization temperature that is lower than the Curie temperature by about 10° C. at most, the surface charges can be easily removed. In this way, the polarization quantity of the dielectric-polarization plate 13 is greatly reduced, and the top surface of the dielectric-polarization plate 13 is grounded, and the influence of the charged particles adsorbed on the surface is removed. Then, the dielectric-polarization plate 13 is assembled into the vibrating plate 14 and the case 11 and cooled. Then, the polarization of the dielectric-polarization plate 13 is returned to the state before the dielectric-polarization plate 13 is heated. Thus, the high electric field is generated between the electrodes. The value of the electric field is based on the polarization property and thickness of the dielectric-polarization plate 13 and the distance between the electrodes. However, it is easy to generate the electric field of kV/mm or more.

As the temperature approaches to the Curie temperature, because the spontaneous polarization is reduced, the dielectric-polarization plate 13 is desired to be heated to the charge-neutralization temperature that is lower than the Curie temperature by 10 to 20° C. However, in the case of the ferroelectric material having a great remanent polarization such as the lead zirconate titanate (PZT), a slight drop in the spontaneous polarization can achieve the effectiveness of the present invention. Thus, as far as the heating temperature is equal to or higher than depolarization temperature, the heating can be relaxed to a charge-neutralization temperature much lower than the Curie temperature. For example, although the remanent polarization of $Pb_{0.3}(TiO_3)_{0.7}$—$Pb_{0.7}(ZrO_3)_{0.3}$ is 0.4 C/m² at room temperature, the remanent polarization is 0.25 C/m² at 100° C., and 0.2 C/m² at 200° C., and 0.1 C/m² at 250° C.

Table 3 shows the property comparison between microphone-capsules A and B according to the first embodiment, which are manufactured by using the PZT as the dielectric-polarization plates 13, and a microphone-capsules of an earlier technology (the commercially available ECM capsule). In the measurements of the output ratios in a frequency range between 100 and 1000 Hz, input sound pressures and amplifiers are assumed to be under the same conditions between the microphone-capsule of the earlier technology and the microphone-capsules A and B according to the first embodiment.

TABLE 3

| | | earlier technology | A | B |
|---|---|---|---|---|
| diameter (mm) | | 7 | 30 | 10 |
| gap (μm) | | 45 | 250 | 100 |
| dielectric-poralization | thickness (μm) | 20 | 100 | 150 |
| | dielectric constant | 2 | 2000 | 500 |
| vibration plate | thickness (μm) | 20 | 100 | 20 |
| | elastic coefficient | 2 | 70 | 2 |
| | material | PTFE | pure-aluminum | PTFE |
| output ratio (100 to 1000 Hz)(dB) | | 1 | 88 | 32 |
| remanent polarization (μC/m²) | | 10 | 44500 | 12000 |

On Table 3, as for the microphone-capsules A and B, the heating temperature is set to 200° C., which is executed in the ambient of air, at the manufacturing stage shown in FIG. 3(b). As to the microphone-capsule B, in which the thickness of the vibrating plate 14 is $t_v$=20 μm, the output ratio of the microphone-capsule B against to the microphone-capsule of the earlier technology is 32 dB, in a frequency range between 100 and 1000 Hz. Thus, a microphone-capsule whose sensibility has been greatly improved is achieved is shown. In view of the fact that the remanent polarization of the microphone-capsule B is a maximum of 12 mC/m², and the remanent polarization of the PZT is enormously greater than that of the microphone-capsule B, it can be considered that the similar performance can be achieved even at much lower charge-neutralization temperature.

As to the microphone-capsule A, in which the thickness of the vibrating plate 14 is $t_v$=100 μm, the output ratio of the microphone-capsule A against to the microphone-capsule of the earlier technology is 8 dB, in a frequency range between 100 and 1000 Hz. Thus, the improvements of the sensibility of the microphone-capsule A can be understood. Similar to the microphone-capsule B, because the remanent polarization of the microphone-capsule A is a maximum of 4.5 mC/m², we can understand that the remanent polarization of the PZT is enormously greater than that of the microphone-capsule A.

However, in the manufacturing process of the microphone-capsules A and B, because a dean bench and/or a clean room are not used, the microphone-capsules A and B are not manufactured in a clean air. Thus, there is a possibility that the dielectric breakdown strength is low. Hence, if the microphone-capsules A and B were manufactured in the clean bench and/or the clean room, it is possible to manufacture the microphone-capsule having further higher sensibilities.

Figure 4:
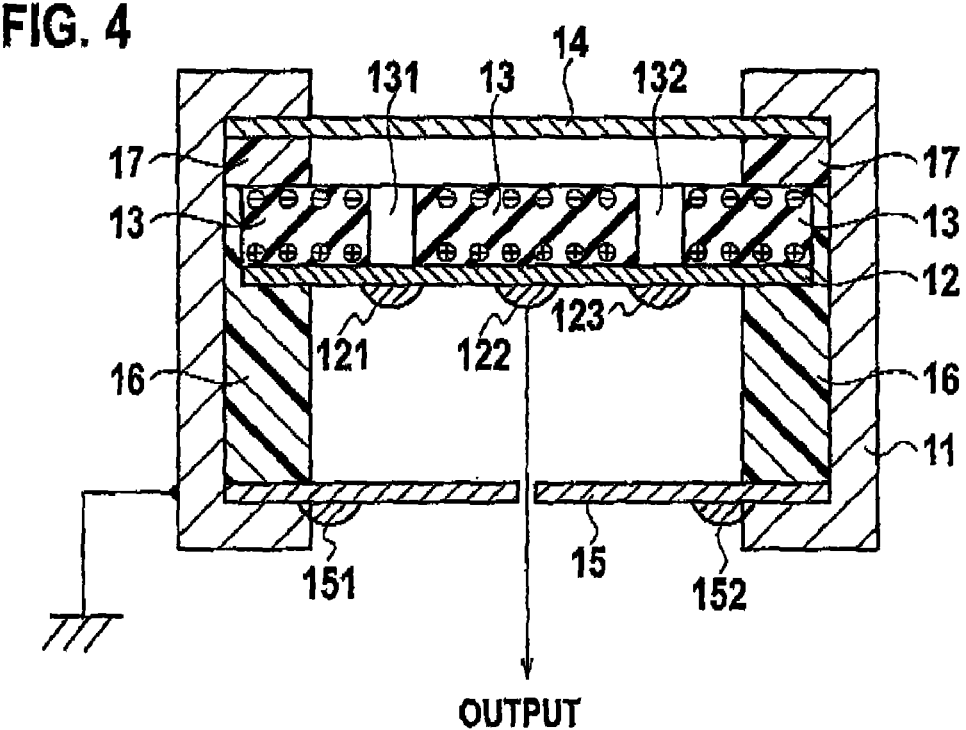
FIG. 4 is a diagrammatically sectional view describing a schematic configuration of an electro-mechanical transducer (microphone-capsule) according to a modification of the first embodiment of the present invention.

As can be understood from the output performance of the microphone-capsule B shown on Table 3, it is possible to obtain the output of an order of voltages, by suitably designing the microphone-capsule, including the shapes, dimensions and the like of the vibrating plate 14 and the dielectric-polarization plate 13. As illustrated in a modification shown in FIG. 4, it is possible to omit the amplifier (FEN) 21 and the output circuit 9 in the structure shown in FIG. 1. In the structure of the microphone-capsule shown in FIG. 4, the output lead (wiring) connected through the solder 122 to the center of the back electrode 12 corresponds to "induced-charge measuring unit configured to measure charges induced by displacement of vibration surface". That is, in the structure of the microphone-capsule according to the modification of the first embodiment shown in FIG. 4, the potential between the back electrode 12 and the vibrating plate 14 is directly fed out, thereby measuring the charges induced onto the dielectric-polarization plate 13, in association with the displacement of the vibration surface of the vibrating plate 14. An external circuit (not shown) is connected to the output terminal of the output lead (wiring), and the signal process necessary for the communicating apparatus and the recoding apparatus that are connected to the microphone is carried out by the external circuit. According to the electro-mechanical transducer based on the modification of the first embodiment shown in FIG. 4, the microphone-capsule having no power supply can be manufactured, and the amplifier (FET) 21 and the output circuit 9 are not required, which can make the miniaturization easy and make the manufacturing cost low.

<Manufacturing in Low Cost Environment>

When impurities are floating in a space between the electrodes, impurities are charged, and charged impurities induce discharge. In order to avoid discharges ascribable to the charged impurities, as mentioned above, manufacturing processes of the electro-mechanical transducer in clean ambient, such as in the clean bench, in the clean room, in the vacuum environment and the like, are desired in order to improve the sensitivity performance of the electro-mechanical transducer.

However, on the other hand, using the property that the dielectric-polarization plate 13 can adsorbs the floating charged particles, we can manufacture the electro-mechanical transducer at a lower cost. For example, when the surface of the dielectric-polarization plate 13 is porous, the dielectric-polarization plate 13 is cooled in the stage of FIG. 3(*d*). Then, since the polarizations of the dielectric-polarization plate 13 are increased, the charged particles between the electrodes are adsorbed in the dielectric-polarization plate 13. Consequently, although the polarization quantity of the dielectric-polarization plate 13 that effectively acts on the electrode is decreased, when the polarity property and thickness of the dielectric-polarization plate 13 and the distance between the electrodes are suitably designed, a high electric field can be still held between the electrodes. Thus, an electro-mechanical transducer can be manufactured even in an environment other than the clean air, such as in the clean room facility and the like. By considering a facility investment for the clean air environment, the electro-mechanical transducer can be manufactured at a lower cost.

<High-Heat-Resistance Performance>

In the case of the high polymer film used as the electret in the ECM of earlier technology, when the temperature is increased, the polarization quantity is decreased, and because the polarization quantity is never returned to the original state, the sensibility drops. However, in the case of the ferroelectric material, unless the temperature is increased to the Curie temperature, even if the increase of the temperature causes the spontaneous polarization quantity to be transiently decreased, when the temperature is decreased to room temperature, the spontaneous polarization quantity is returned to the original state. Thus, the heat-resistance property of the electro-mechanical transducer according to the first embodiment is high, and the sensibility is never dropped. Also, when the temperature is increased, the sensibility is transiently dropped in association with the decrease in the spontaneous polarization quality of the ferroelectric material. However, the electro-mechanical transducer according to the first embodiment can be used up to a temperature close to the temperature heated during the electro-mechanical transducer is manufactured. Hence, the heat-resistance property of the electro-mechanical transducer according to the first embodiment is high.

Second Embodiment

As described in the electro-mechanical transducer according to the first embodiment, in the case of the ferroelectric material, as compared with the electret film used in the ECM capsule in the earlier technology, the remanent polarization quantity is very high, which generates the high electric field between the vibrator (vibrating plate) 14 and the dielectric-polarization plate 13. Although the magnitude of the electric field is based on the polarization property and thickness of the dielectric-polarization plate 13 and the distance between the electrodes, the electric field of kV/mm or more can be generated. In this case, there is a case that the discharging is generated from the vibrator 14 implemented by a metallic electrode. Once the discharging is ignited between the vibrating plate 14 and the dielectric-polarization plate 13, the surface of the dielectric-polarization plate 13 is again charged to some degree. For this reason, the excellent polarization property of the ferroelectric material cannot be sufficiently exhibited. In order to avoid this, in the case of the electro-mechanical transducer according to the fret embodiment, an insulating gas or an insulating fluid is filled in the gap space between the vibrating plate 14 and the dielectric-polarization plate 13 so that the dielectric breakdown strength of the gap space can be increased. As a result, the discharging is difficult to generate.

Figure 5:
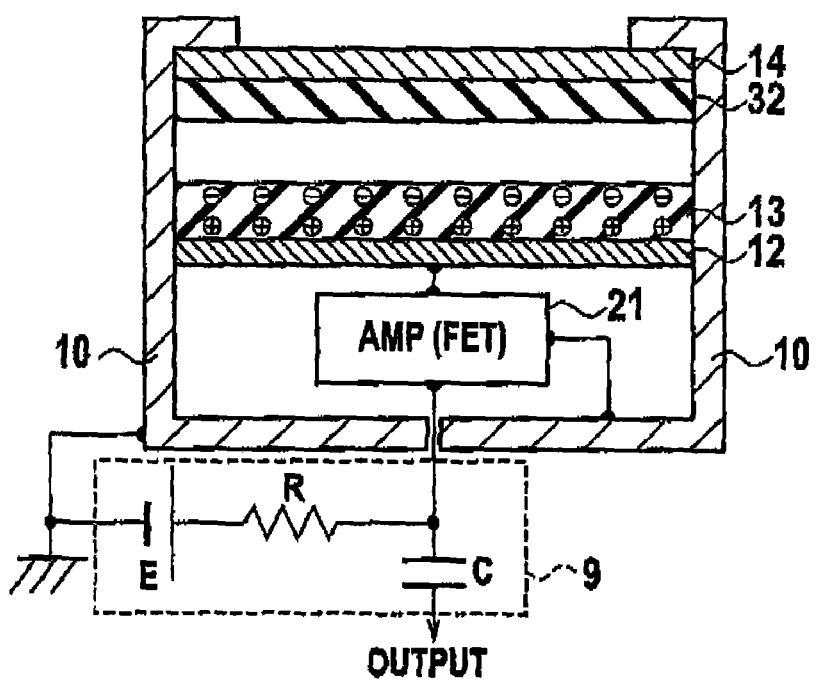
FIG. 5 is a diagrammatically sectional view describing a schematic configuration of an electro-mechanical transducer (microphone-capsule) according to a second embodiment of the present invention.

An electro-mechanical transducer according to a second embodiment of the present invention differs from the electro-mechanical transducer according to the first embodiment, in that as shown in FIG. 5, an insulating coat film 32 is formed on a surface (vibration surface) facing to the dielectric-polarization plate 13 in the vibrating plate 14 and then an insulation coating is performed, and this difference is the feature of the second embodiment. As shown in FIG. 5, since the insulating coat film 32 is formed on the vibrating plate 14, the charges adsorbed on the surface of the dielectric-polarization plate 13 by the discharging can be reduced, thereby improving the sensibility of the microphone-capsule.

That is, as shown in FIG. 5, the electro-mechanical transducer according to the second embodiment of the present invention is a microphone-capsule that contains: the vibrator (vibrating plate) 14 implemented by the conductor having the flat vibration surface; the insulating coat film 32 coated on the vibration surface of the vibrating plate 14; the dielectric-polarization plate 13 which is sandwiched between the flat first principal surface facing to the insulating coat film 32 and the second principal surface facing parallel to the first principal surface and in which the polarization directions are aligned; the back electrode 12 joined to the second principal surface of the dielectric-polarization plate 13; and the induced-charge measuring unit (21, 9) configured to measure the charges induced onto the dielectric-polarization plate 13, in association with the displacement of the vibration surface. Under no load, the first principal surface of the dielectric-polarization plate 13 faces parallel to the insulating coat film 32.

Here, the induced-charge measuring unit (21, 9) contains: an amplifier (FET) 21 connected to the back electrode 12; and an output circuit 9 connected to the amplifier (FET) 21, similarly to the electro-mechanical transducer according to the first embodiment. However, as described in the electro-mechanical transducer according to the first embodiment, it is possible to omit the amplifier (FET) 21 and the output circuit 9. The external circuit (not shown) is connected to the output terminal of the coupling capacitor C serving as the output terminal of the induced-charge measuring unit (21, 9). Then, the signal process necessary for the communicating apparatus and the recording apparatus that are connected to the microphone is carried out by the external circuit. The induced-charge measuring unit (21, 9) in the electro-mechanical transducer according to the second embodiment of the present invention measures the charges induced onto the dielectric-polarization plate 13, in association with the displacement of the vibration surface of the vibrating plate 14, because the amplifier (FET) 21 amplifies the potential between the back electrode 12 and the vibrating plate 14.

As "the insulating coat film 32", it is possible to employ, for example, high polymer films such as poly-tetra-fluoro-ethylene (PTFE) and the like, glass films such as quartz and the like so that a dielectric breakdown strength of the gap between the vibrating plate 14 and the dielectric-polarization plate 13 can be increased by coating such material as the insulating coat film 32 on the vibrating plate 14. Then, the vibrating plate 14, the insulating coat film 82, the dielectric-polarization plate 13, the back electrode 12 and the amplifier (PET) 21 are accommodated in the conductive (metallic) case 10.

Although the illustrations on a plan view and a bird's eye view are omitted, each of the vibrating plate 14, the insulating coat film 82, the dielectric-polarization plate 13 and the back electrode 12 in the microphone-capsule shown in FIG. 5 has the shape of the circular plate. Although the illustration is omitted on the sectional view of FIG. 5, the dielectric-polarization plate 13 and the back electrode 12, which have the shapes of the circular plates, may be sandwiched between the spacer ring 17 implemented by insulator and the holder 16 implemented by cylindrical insulator, similarly to the illustration in FIG. 1. Similarly to the illustration in FIG. 1, the case 10 may be structured such that the peripheral portion of the vibrating plate 14 having the shape of the circular plate is connected to the top end surface of the spacer ring 17 and such that the bottom plate 15 implemented by the metallic circular plate having wiring openings are connected to the bottom end surface of the holder 16.

Of course, similarly to the electro-mechanical transducer according to the first embodiment, when an insulating gas or fluid is filled in the gap space between the dielectric-polarization plate 13 and the insulating coat film 32, the dielectric breakdown strength is further increased, which makes the generation of the discharge difficult. As a result, the charge quantity on the surface of the dielectric-polarization plate 13, which is adsorbed by discharging, can be decreased, thereby improving the sensibility. Instead of the filling the insulating gas or fluid, even if the gap space between the dielectric-polarization plate 13 and the vibrating plate 14 is evacuated so as to establish a vacuum environment, the sensibility can be improved.

The other configurations and features, such as the configuration in which the single-crystalline or poly-crystalline ferroelectric ceramic and some crystalline high polymer and the like can be mainly employed for the dielectric-polarization plate 13 in the electro-mechanical transducer (microphone-capsule) according to the second embodiment are substantially similar to those of the electro-mechanical transducer (microphone-capsule) according to the first embodiment. Thus, the duplex explanations are omitted.

According to the electro-mechanical transducer (microphone-capsule) according to the second embodiment of the present invention, because the insulating coat film 32 is coated on the vibration surface of the vibrating plate 14, the discharging is difficult to be ignited between the vibrating plate 14 and the dielectric-polarization plate 13. Thus, since the dielectric breakdown strength can be increased, the excellent polarization property of the ferroelectric material can be sufficiently exhibited. Hence, the charge quantity adsorbed on the surface of the dielectric-polarization plate 13 by the discharging can be decreased, thereby improving the sensibility of the microphone-capsule.

The manufacturing method of the electro-mechanical transducer (microphone-capsule) according to the second embodiment of the present invention will be described below with reference to FIG. 6. By the way, the manufacturing method of the electro-mechanical transducer which will be described below is one example. Naturally, it can be achieved by the various manufacturing methods other than the following procedure, including the modification of the following procedure.

Figure 6:
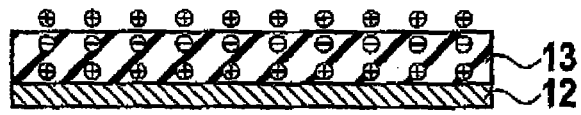
FIG. 6 is a step sectional view describing a manufacturing method of the electro-mechanical transducer (microphone-capsule) according to the second embodiment of the present invention.
Figure 6:
Figure 6:
Figure 6:
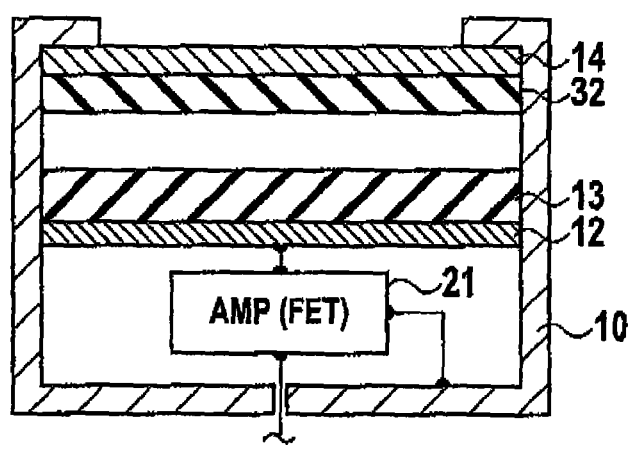
Figure 6:
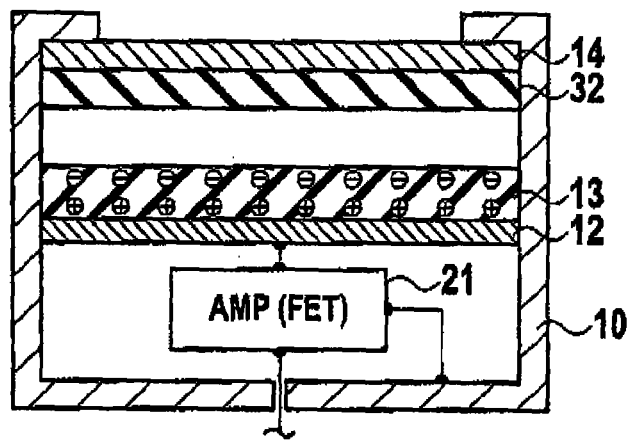

(a) Similarly to the manufacturing method of the electro-mechanical transducer according to the first embodiment, by the sintering and the like, the circular dielectric-polarization plate 13 is metallurgically connected on the circular back electrode 12, as shown in FIG. 6(*a*). Although the thickness of the dielectric-polarization plate 13 is determined by considering the design policy explained by using the Eqs. (1) to (3), the thickness of the dielectric-polarization plate 13 may be set, for example, between about 20 and 400 µm. The thickness of the back electrode 12 may be selected in the range between, for example, 10 and 100 µm. In its original state, the dielectric-polarization plate 13 cannot be used in the microphone-capsule according to the second embodiment, because the charged particles are adsorbed on its surface, as shown in FIG. 6(*a*), even if the polarization directions are aligned. So, similarly to the manufacturing method of the electro-mechanical transducer according to the first embodiment, the dielectric-polarization plate 13 is heated to the charge-neutralization temperature (for example, between about 200° C. and about 300° C. in the case of the PZT) that is predetermined in a range between the depolarization temperature and the Curie temperature. Then, as shown in FIG. 6(*b*), the remanent polarization of the dielectric-polarization plate 13 is decreased. In the state shown in FIG. 6(*b*), the surface charges still remain on the surface of the dielectric-polarization plate 13. Thus, as shown in FIG. 6(*c*), in the state that the dielectric-polarization plate 13 is heated, the surface charges on the surface of the dielectric-polarization plate 13 is removed (neutralized).

(b) On the other hand, a laminated structure in which an insulating film having a thickness of about 5 to 150 µm is coated on a metal (conductor) having a thickness of 10 to 100 µm is prepared. The laminated structure is cut away by a wire-saw, a diamond blade or the like so that a radius of the laminated structure is equal to the radius of the dielectric-polarization plate 13. Then, a circular plate encompassing a vibrating plate 14 and an insulating coat film 32 joined on the surface of the vibrating plate 14 is prepared (the thickness of the vibrating plate 14 is determined by considering the design policy explained by using the Eqs. (1) to (3)). For example, when the fluorine-based resin such as PTFE and the like is coated as the insulating coat film 32, it may be sprayed onto the metallic plate, such as an air gun paint, or high polymer films such as a PTFE sheet and the like may be stuck on the metallic plate. In addition, by using the various methods such as an airless gun paint, a fluidization dip method, a static paint method, a dipping method, a flame spray method, a plasma CVD method, a sputtering method and the like, the desirable various insulating films can be coated on the metallic plate. Then, keeping a heating state such that the dielectric-polarization plate 13 to which the back electrode 12 is joined is being heated (at a high temperature of between about 200° C. and about 300° C. in the case of the PZT), as shown in FIG. 6(*d*), together with the vibrating plate 14 to which the insulating coat film 32 is joined and the amplifier (FET) 21, the dielectric-polarization plate 13 is assembled into a conductive (metallic) case 10.

(c) After that, when the dielectric-polarization plate 13 is cooled to room temperature, as show in FIG. 6(*e*), the polarization state of the dielectric-polarization plate 13 is returned. By the way, as to the stage shown in FIG. 6(*d*), similar to the method already shown in FIG. 3(*c*), if turning the orientation upside down so that the side of the vibrating plate 14, to which the insulating coat film 32 is joined, lie in downward, and the spacer ring 17 made of insulator is connected on the periphery of the insulating coat film 32, and the dielectric-polarization plate 13, to which the back electrode 12 is joined at the second principal surface, is attached on the spacer ring 17, and if the dielectric-polarization plate 13 and the back electrode 12 are assembled in the inside of the conductive (metallic) case 10 so that the dielectric-polarization plate 13 and the back electrode 12 are sandwiched between the spacer ring 17 and the holder 16, the amplifier (FEZ 21, which is weak against heat, can be assembled at a timing after the conductive (metallic) case 10 is cooled to room temperature. However, as explained in the sensibility recovering method of the electro-mechanical transducer according to the fourth embodiment of the present invention which will be described later, when the sensibility is recovered by re-annealing process, electronic elements such as the FET 21 and the like which can endure the temperatures between about 200° C. and about 300° C. is selected. Thus, as shown in FIG. 6(d), together with the vibrating plate 14 to which the insulating coat film 32 is joined and the amplifier (FET) 21, the dielectric-polarization plate 13 may be assembled into the conductive (metallic) case 10, which is kept at high temperature state, and then cooled to room temperature.

Third Embodiment

Figure 7:
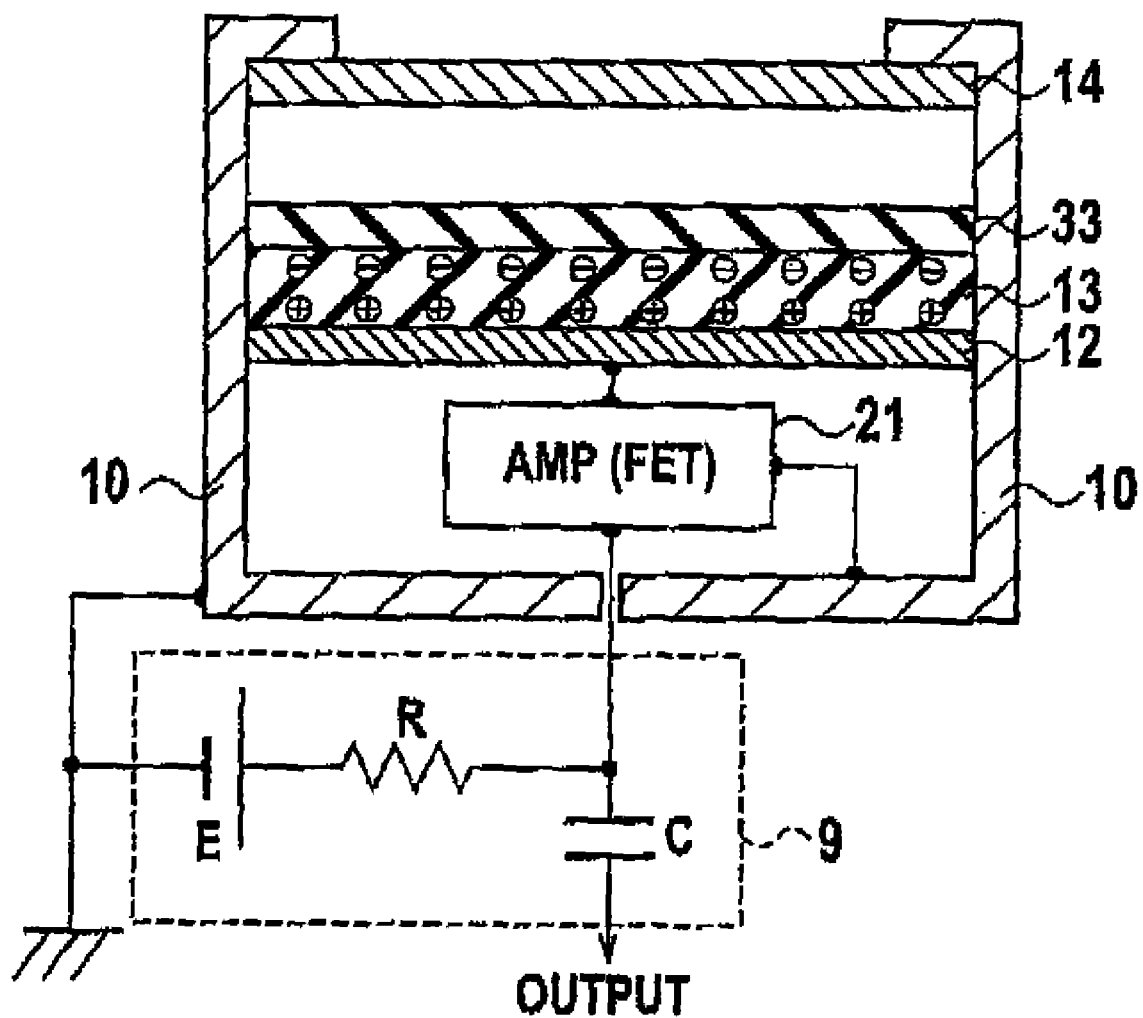
FIG. 7 is a diagrammatically sectional view describing a schematic configuration of an electro-mechanical transducer (microphone-capsule) according to a third embodiment of the present invention.

As described in the electro-mechanical transducers according to the first and second embodiments, once the discharging is ignited between the vibrating plate 14 and the dielectric-polarization plate 13, the surface of the dielectric-polarization plate 13 is again charged to some degree. Thus, the excellent polarization property of the ferroelectric material cannot be sufficiently exhibited. In order to avoid the discharging between the vibrating plate 14 and the dielectric-polarization plate 13, in the electro-mechanical transducer according to the second embodiment, as shown in FIG. 5, the insulating coat film 32 was formed on the surface (vibration surface) of the vibrating plate 14, the surface (vibration surface) facing to the dielectric-polarization plate 13, so as to perform an insulation coating. However, as shown in FIG. 7, an insulating coat film 33 may be formed on the side of the dielectric-polarization plate 13. That is, as shown in FIG. 7, since the insulating coat film 33 is formed on the side of the dielectric-polarization plate 13, the charge quantity adsorbed on a surface of the dielectric-polarization plate 13 by the discharging can be decreased, thereby improving the sensibility of the microphone-capsule.

Specifically describing, as shown in FIG. 7, the electro-mechanical transducer according to the third embodiment of the present invention is the microphone-capsule that contains: the vibrator (vibrating plate) 14 implemented by the conductor having a flat vibration surface; the insulating coat film 33 having a flat principal surface facing to the vibrating plate 14; the dielectric-polarization plate 13 which is sandwiched between the flat first principal surface joined to the insulating coat film 33 and a second principal surface facing parallel to the first principal surface and in which polarization directions are aligned; the back electrode 12 joined to the second principal surface of the dielectric-polarization plate 13; and the induced-charge measuring unit (21, 9) configured to measure the charges induced onto the dielectric-polarization plate 13, in association with the displacement of the vibration surface. Under no load, the insulating coat film 33 faces parallel to the vibration surface of the vibrating plate 14.

Here, the induced-charge measuring unit (21, 9) contains: an amplifier (FET) 21 connected to the back electrode 12; and an output circuit 9 connected to the amplifier (FET) 21, similarly to the electro-mechanical transducers according to the first and second embodiments. However, as described in the electro-mechanical transducers according to the first and second embodiments, it is possible to omit the amplifier (FET) 21 and the output circuit 9. The external circuit (not shown) is connected to the output terminal of the coupling capacitor C serving as the output terminal of the induced-charge measuring unit (21, 9). Then, the external circuit carries out the signal process necessary for the communicating apparatus and the recording apparatus that are connected to the microphone. The induced-charge measuring unit (21, 9) in the electro-mechanical transducer according to the third embodiment of the present invention measures the charges induced onto the dielectric-polarization plate 13, in association with the displacement of the vibration surface of the vibrating plate 14, because the amplifier (FET) 21 amplifies the potential between the back electrode 12 and the vibrating plate 14.

As "the insulating coat film 32", it is possible to employ, for example, high polymer films such as PTFE and the like, glass films such as quartz and the like, which are exemplified in the electro-mechanical transducer according to the second embodiment, so that a dielectric breakdown strength of the gap between the vibrating plate 14 and the dielectric-polarization plate 13 can be increased by coating such material as the insulating coat film 32 on the vibrating plate 14. Then, the vibrating plate 14, the insulating coat film 88, the dielectric-polarization plate 13, the back electrode 12 and the amplifier (FET) 21 are accommodated in the conductive (metallic) case 10.

Although the illustrations on a plan view and a bird's eye view are omitted, each of the vibrating plate 14, the insulating coat film 83, the dielectric-polarization plate 13 and the back electrode 12 in the microphone-capsule shown in FIG. 7 has the shape of the circular plate. Although the illustration is omitted on the sectional view of FIG. 7, the insulating coat film 33, the dielectric-polarization plate 13 and the back electrode 12, which have the shapes of the circular plates, may be sandwiched between the spacer ring 17 implemented by insulator and the holder 16 implemented by cylindrical insulator, similarly to the illustration in FIG. 1.

Of course, similarly to the electro-mechanical transducers according to the first and second embodiments, when an insulating gas or fluid is filled in the gap space between the vibrating plate 14 and the insulating coat film 33, the dielectric breakdown strength is further increased, which makes the generation of the discharge fault. As a result, the charge quantity on the surface of the dielectric-polarization plate 13, which is adsorbed by discharging, can be decreased, thereby improving the sensibility. Instead of the filling the insulating gas or fluid, even if the gap space between the vibrating plate 14 and the insulating coat film 33 is evacuated so as to establish a vacuum environment, the sensibility can be improved.

The other configurations and features, such as the configuration in which the single-crystalline or poly-crystalline ferroelectric ceramic and some crystalline high polymer and the like can be mainly employed for the dielectric-polarization plate 13 in the electro-mechanical transducer (microphone-capsule) according to the third embodiment are substantially similar to those of the electro-mechanical transducers (microphone-capsules) according to the first and second embodiments. Thus, the duplex explanations are omitted.

According to the electro-mechanical transducer (microphone-capsule) pertaining to the third embodiment of the present invention, because the insulating coat film 83 is coated on the first principal surface of the dielectric-polarization plate 13, the discharging is difficult to be ignited between the vibrating plate 14 and the dielectric-polarization plate 13. Thus, since the dielectric breakdown strength of the gap space between the vibrating plate 14 and the insulating coat film 33 can be increased, the excellent polarization property of the ferroelectric material can be sufficiently exhibited. Hence, the charge quantity adsorbed on a surface of the dielectric-polarization plate 13 by the discharging can be decreased, thereby improving the sensibility of the microphone-capsule.

The manufacturing method of the electro-mechanical transducer (microphone-capsule) according to the third embodiment of the present invention will be described below with reference to FIG. 8. By the way, the manufacturing method of the electro-mechanical transducer, which will be described below, is one example. Naturally, it can be achieved by the various manufacturing methods other than the following procedure, including the modification of the following procedure.

(a) Similarly to the manufacturing methods of the electromechanical transducers, according to the first and second embodiments, by the sintering and the like, the circular dielectric-polarization plate 13 is metallurgically connected on the circular back electrode 12, as shown in FIG. 8(a). Moreover, similarly to the manufacturing methods of the electro-mechanical transducers according to the first and second embodiments, the dielectric-polarization plate 13 is heated to the charge-neutralization temperature that is predetermined in a range between the depolarization temperature and the Curie temperature. Then, as shown in FIG. 8(b), the remanent polarization of the dielectric-polarization plate 13 is decreased. Moreover, as shown in FIG. 8(c), by heating the dielectric-polarization plate 13, the surface charges on the surface of the dielectric-polarization plate 13 is removed (neutralized).

(b) Moreover, keeping in the state that the dielectric-polarization plate 13 is heated at the charge-neutralization temperature, as shown in FIG. 8(d), an insulating coat film 33 having a thickness of about 1 to 20 μm is coated on the surface (first principal surface) of the dielectric-polarization plate 13. As for the coating, similarly to the manufacturing method of the electro-mechanical transducer according to the second embodiment, it is possible to employ the various methods, such as the air gun paint, the airless gun paint, the fluidization dip method, the static paint method, the dipping method, the flame spray method, the plasma CVD method, the sputtering method and the like. As for the dielectric-polarization plate 13 in which the back electrode 12 is joined to the second principal surface and also the insulating coat film 33 is coated on the first principal surface, while keeping the dielectric-polarization plate 13 at the heating temperature (in the care of the PZT, while the high temperature state between about 200° C. and about 300° C. is kept), as shown in FIG. 8(e), together with the vibrating plate 14 and the amplifier (FET) 21, the dielectric-polarization plate 13 is assembled into the conductive (metallic) case 10.

(c) After that when the dielectric-polarization plate 13 is cooled to room temperature, as show in FIG. 8(f), the polarization state is returned. By the way, in the stage shown in FIG. 8(e), as already shown in FIG. 3(c), by turning the orientation upside down so that the side of the vibrating plate 14 lie in downward, and the spacer ring 17 made of insulator is connected on the periphery of the vibrating plate 14, and the dielectric-polarization plate 13, in which the back electrode 12 is joined to the second principal surface and also the insulating coat film 33 is coated on the first principal surface, is attached on the spacer ring 17. Then, the back electrode 12, the dielectric-polarization plate 13 and the insulating coat film 33 may be assembled inside the conductive (metallic) case 10 so that they are sandwiched between the spacer ring 17 and the holder 16. This procedure with the spacer ring 17 enables the amplifier (FET) 21, which is weak against heat, to be assembled, after the conductive (metallic) case 10 is cooled to room temperature.

<Modification of Third Embodiment>

In order to protect the discharging between the vibrating plate 14 and the dielectric-polarization plate 13, in the electro-mechanical transducer according to the second embodiment, as shown in FIG. 5, the insulating coat film 32 is formed on the surface (vibration surface) of the vibrating plate 14, the surface facing to the dielectric-polarization plate 13, and in the electro mechanical transducer according to the third embodiment, as shown in FIG. 7, the insulating coat film 33 is formed on the side of the dielectric-polarization plate 13. However, as shown in FIG. 9, by combining the structure shown in FIG. 5 and the structure shown in FIG. 7 and forming the insulating coat film 32 on the side of the vibrating plate 14 and then forming the insulating coat film 33 on the side of the dielectric-polarization plate 13, it is possible to further decrease the charge quantity adsorbed on the surface of the dielectric-polarization plate 13 by an unintended discharging, and thereby further improving the sensibility of the microphone-capsule.

Figure 9:
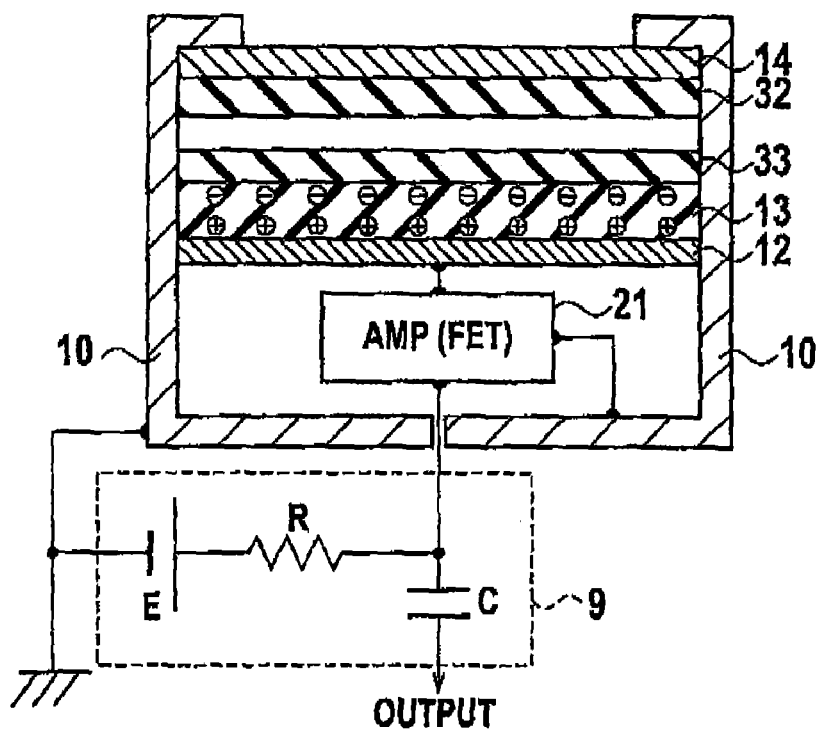
FIG. 9 is a diagrammatically sectional view describing a schematic configuration of an electro-mechanical transducer (microphone-capsule) according to a modification of the third embodiment of the present invention.

Specifically describing, as shown in FIG. 9, the electro-mechanical transducer according to the modification of the third embodiment of the present invention is the microphone-capsule that contains: a vibrator (vibrating plate) 14 implemented by the conductor having the flat vibration surface; an insulating coat film 32 coated on the vibration surface of the vibrating plate 14; an insulating coat film 33 having a flat principal surface facing to the insulating coat film 32; a dielectric-polarization plate 13 which is sandwiched between the flat first principal surface joined to the insulating coat film 33 and the second principal surface facing parallel to the first principal surface and in which the polarization directions are aligned; a back electrode 12 joined to the second principal surface of the dielectric-polarization plate 13; and an induced-charge measuring unit (21, 9) configured to measure the charges induced onto the dielectric-polarization plate 13, in association with the displacement of the vibration surface. Here, the induced-charge measuring unit (21, 9) contains: an amplifier (FET) 21 connected to the back electrode 12; and an output circuit 9 connected to the amplifier (FET) 21. However, it is possible to omit the amplifier (FET) 21 and the output circuit 9. As "the insulating coat film 33", it is possible to employ high polymer films such as PTFE and the like, glass films such as quartz and the like, which are exemplified in the electro-mechanical transducer according to the second and third embodiments, so that the dielectric breakdown strength of the gap space can be increased by coating the insulating coat film 33 on the dielectric-polarization plate 13. Then, the vibrating plate 14, the insulating coat film 32, the insulating coat film 33, the dielectric-polarization plate 13, the back electrode 12 and the amplifier (FET) 21 are accommodated in the conductive (metallic) case 10.

Although the illustrations on a plan view and a bird's eye view are omitted, each of the vibrating plate 14, the insulating coat film 32, the insulating coat film 33, the dielectric-polarization plate 13 and the back electrode 12 in the microphone-capsule shown in FIG. 9 has the shape of the circular plate. Although the illustration is omitted on the sectional view of FIG. 9, the insulating coat film 33, the dielectric-polarization plate 13 and the back electrode 12 may be sandwiched between the spacer ring 17 implemented by insulator and the holder 16 implemented by cylindrical insulator, similarly to the illustration in FIG. 1.

Of course, similarly to the electro-mechanical transducers according to the first to third embodiments, when an insulating gas or fluid is filled in the gap space between the insulating coat film 32 and the insulating coat film 33, the dielectric breakdown strength of the gap space is further increased, which makes the generation of the discharge difficult. As a result, the adsorbed charge quantity on the surface of the dielectric-polarization plate 13, the charges are generated by discharging, can be decreased, thereby improving the sensibility.

The other configurations and features, such as the configuration in which the single-crystalline or poly-crystalline ferroelectric ceramic and some crystalline high polymer and the like can be mainly employed for the dielectric-polarization plate 13 in the electro-mechanical transducer (microphone-capsule) according to the modification of the third embodiment are substantially similar to those of the electro-mechanical transducers (microphone-capsules) according to the first to third embodiments. Thus, the duplex explanations are omitted.

According to the electro-mechanical transducer (microphone-capsule) pertaining to the modification of the third embodiment of the present invention, because the insulating coat film 32 is coated on the vibration surface of the vibrating plate 14, and the insulating coat film 33 is also coated on the first principal surface of the dielectric-polarization plate 13, the discharging is difficult to be ignited between the vibrating plate 14 and the dielectric-polarization plate 13. Thus, since the dielectric breakdown strength of the gap space can be further increased, the excellent polarization property of the ferroelectric material can be sufficiently exhibited. Hence, the charge quantity adsorbed on a surface of the dielectric-polarization plate 13 by the discharging can be further decreased, thereby further improving the sensibility of the microphone-capsule.

Figure 8:
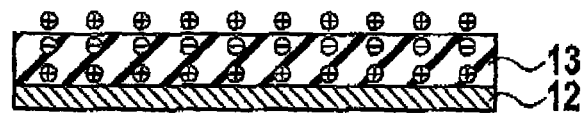
FIG. 8 is a diagrammatically step sectional view describing a manufacturing method of the electro-mechanical transducer (microphone-capsule) according to the third embodiment of the present invention.
Figure 8:
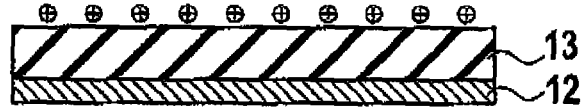
Figure 8:
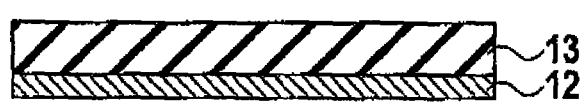
Figure 8:
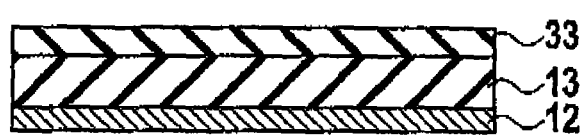
Figure 8:
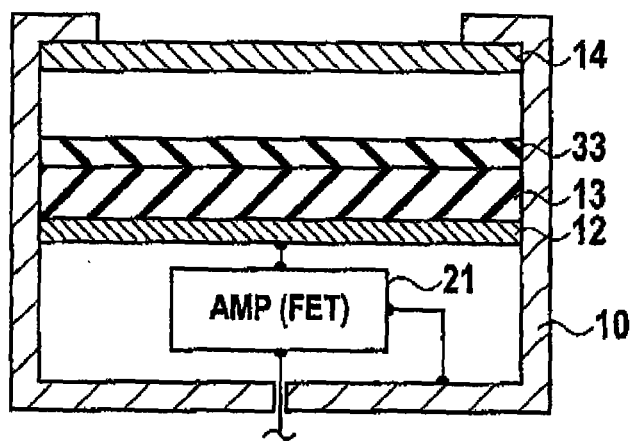
Figure 8:
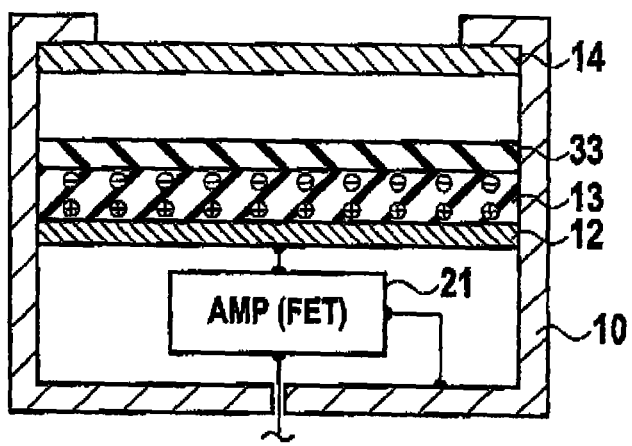

The manufacturing method of the electro-mechanical transducer (microphone-capsule) according to the modification of the third embodiment of the present invention can be easily achieved by combining the manufacturing methods of the electro-mechanical transducers, according to the second and third embodiments, which are shown in FIG. 6 and FIG. 8. Thus, the duplex explanations are omitted.

Fourth Embodiment

As already described in the first embodiment, the heat-resistance property of the electro-mechanical transducer according to a feature of the present invention is high. Moreover, as described in the electro-mechanical transducers according to the first to third embodiments, as the charge quantity adsorbed on a surface of the dielectric-polarization plate 13 is increased, the sensibility drops. However, when the sensibility drops, the dielectric-polarization plate 13 is re-heated to the temperature close to the Curie temperature so that the polarizations inside the ferroelectric material implementing the dielectric-polarization plate 15 are greatly decreased, which causes the electric field generated by the surface charges to be dominant. Then, the discharging in a reverse direction is generated, and the opposite electrode absorbs the surface charges until the magnitude of the electric field decreases to strength equal to the dielectric breakdown strength or less. As a result, by re-annealing process, the charges adsorbed on the surface of the ferroelectric material can be decreased, which causes the sensibility of the microphone-capsule to be again improved.

When the electro-mechanical transducer (microphone-capsule) is heated, by using the difference of thermal expansion coefficients between the members implementing the electro-mechanical transducer (microphone-capsule), the gap between the vibrating plate 14 and the dielectric-polarization plate 13 can be made narrower. Or, if the vibrating plate 14 and the dielectric-polarization plate 13 can be designed to contact with each other, the much surface charges can be removed from the surface of the dielectric-polarization plate 13.

Figure 10:
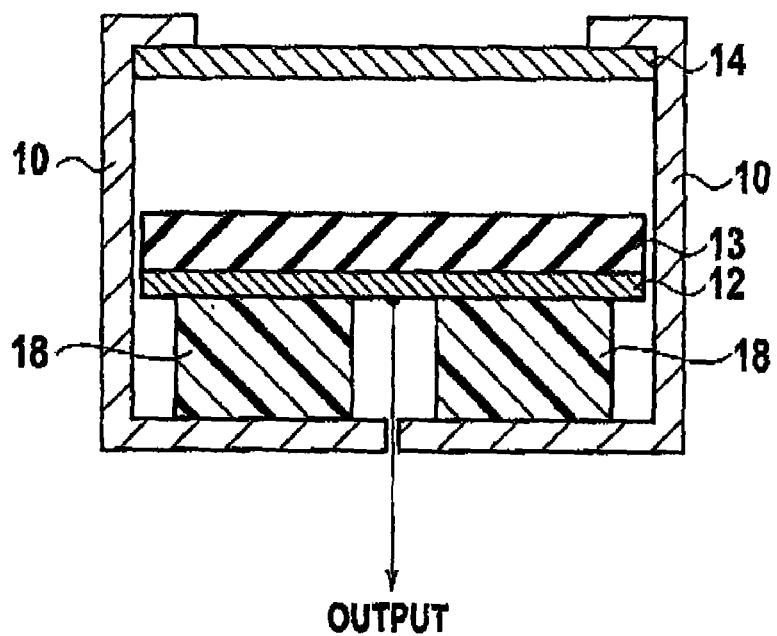
FIG. 10 is a diagrammatically sectional view describing a schematic configuration of an electro-mechanical transducer (microphone-capsule) according to a fourth embodiment of the present invention.

In an electro-mechanical transducer according to a fourth embodiment of the present invention, a resin layer 18 having a high thermal expansion coefficient is sandwiched between the back electrode 12 joined to the second principal surface of the dielectric-polarization plate 13 and the bottom surface of the conductive (metallic) case 10, as shown in FIG. 10. Thus, the execution of the re-annealing process enables the charges adsorbed on the surface of the ferroelectric material to be decreased, which can improve the sensibility of the microphone capsule.

Also, using the fact that the surface resistance and volume resistance of the ferroelectric material is decreased when the ferroelectric material is heated can remove the surface charges. Usually, when the ceramic is heated to 25° C. or more, the resistivity is reduced. For example, when the ferroelectric material is heated until the surface resistance or the volume resistance is $10^{11}$ Ωcm or less, the surface charges are moved to the back electrode 12 or the case 10 within several seconds and removed from the surface. The method of removing the surface charges only by using such heating is effective when the microphone is manufactured.

That is, as shown in FIG. 10, the electro-mechanical transducer according to the fourth embodiment of the present invention is the microphone-capsule that contains: the vibrator (vibrating plate) 14 implemented by the conductor having the flat vibration surface; the dielectric-polarization plate 13 which is sandwiched between the flat first principal surface facing to the vibrating plate 14 and the second principal surface facing parallel to the first principal surface and in which the polarization directions are aligned; the back electrode 12 joined to the second principal surface of the dielectric-polarization plate 13; and the cylindrical resin layer 18 which is inserted under the back electrode 12 and has a wiring through hole in a center. Under no load, the first principal surface of the dielectric-polarization plate 13 faces parallel to the vibration surface of the vibrating plate 14. Here, the vibrating plate 14, the dielectric-polarization plate 13, the back electrode 12 and the resin layer 18 are accommodated in the conductive (metallic) case 10.

For example, a line expansion coefficient between 25 and 250° C. of the PTFE is $1.7 \times 10^{-4}$/° C. Thus, when the PTFE having a thickness of 500 µm is used as the resin layer 18 and it is heated at 250° C., the interval of the gap between the vibrating plate 14 and the dielectric-polarization plate 13 is reduced correspondingly to about 21 µm. As resins for the resin layer 18, the silicon resin having a line expansion coefficient of $2.0 \times 10^{-4}$/° C., the epoxy resin having a line expansion coefficient of $1.8 \times 10^{-4}$/° C., the polyimide resin of $1.3 \times 10^{-4}$/° C., and the polyamide resin of $1.1 \times 10^{-4}$/° C. and the like are preferable.

Also, a shape memory alloy can be used for the resin layer 18. For example, a NiTi alloy indicates a shape recovery temperature of 100° C. and a shape recovery rate of 8%. In a Ti—Zr—Ni alloy and a Zr—Ni—Co alloy, their shape recovery temperatures can be 100° C. or more. Those shape memory alloy enables the large deformation to be obtained, although those operation temperatures are low.

As described in the electro mechanical transducers according to the first to third embodiments, the amplifier (FET) 21 and the output circuit 9, which are used in the electro-mechanical transducers according to the first to third embodiments, are omitted in the electro-mechanical transducer according to the fourth embodiment. In the structure shown in FIG. 10, the output lead (wiring) connected through the high melting point solder and the like to the center of the back electrode 12 corresponds to "induced-charge measuring unit configured to measure charges induced by displacement of vibration surface". In the structure of the microphone-capsule according to the fourth embodiment shown in FIG. 10, the potential between the back electrode 12 and the vibrating plate 14 is directly fed out, thereby measuring the charges induced onto the dielectric-polarization plate 13, in association with the displacement of the vibration surface of the vibrating plate 14. The external circuit (not shown) is connected to the output terminal of the output lead (wiring), and the signal process necessary for the communicating apparatus and the recoding apparatus that are connected to the microphone is carried out by the external circuit. However, similarly to the electro-mechanical transducers according to the first to third embodiments, the amplifier (FET) 21 and the output circuit 9 may be used to implement the induced-charge measuring unit.

Although the illustrations on a plan view and a bird's eye view are omitted, each of the vibrating plate 14, the dielectric-polarization plate 13 and the back electrode 12 in the microphone-capsule shown in FIG. 10 has the shape of the circular plate.

Of course, similarly to the electro-mechanical transducers according to the first to third embodiments, when an insulating gas or fluid is filled in the gap space between the dielectric-polarization plate 13 and the vibrating plate 14, the dielectric breakdown strength is further increased, which makes the generation of the discharge difficult. As a result, the charge quantity on the surface of the dielectric-polarization plate 13, which is adsorbed by discharging, can be decreased, thereby improving the sensibility. Moreover, in order to protect the discharging between the vibrating plate 14 and the dielectric-polarization plate 13, such as the electro-mechanical transducer according to the second embodiment, the insulating coat film 82 may be formed on the surface (vibration surface) facing to the dielectric-polarization plate 13 in the vibrating plate 14, and such as the electro-mechanical transducer according to the third embodiment, the insulating coat film 33 may be formed on the side of the dielectric-polarization plate 13. Moreover, similarly to FIG. 9, by mutually combining the structures of the electro-mechanical transducers according to the second and third embodiments and forming the insulating coat film 32 on the side of the vibrating plate 14 and then forming the insulating coat film 33 on the side of the dielectric-polarization plate 13, it is possible to further decrease the charge quantity adsorbed on the surface of the dielectric-polarization plate 13 by the unintended discharging and further improving the sensibility of the microphone-capsule.

The other configurations and features, such as the configuration in which the single-crystalline or poly-crystalline ferroelectric ceramic and some crystalline high polymer and the like can be mainly employed for the dielectric-polarization plate 13 in the electro-mechanical transducer (microphone-capsule) according to the fourth embodiment are substantially similar to those of the electro-mechanical transducers (microphone-capsules) according to the first to third embodiments. Thus, the duplex explanations are omitted.

Figure 11:
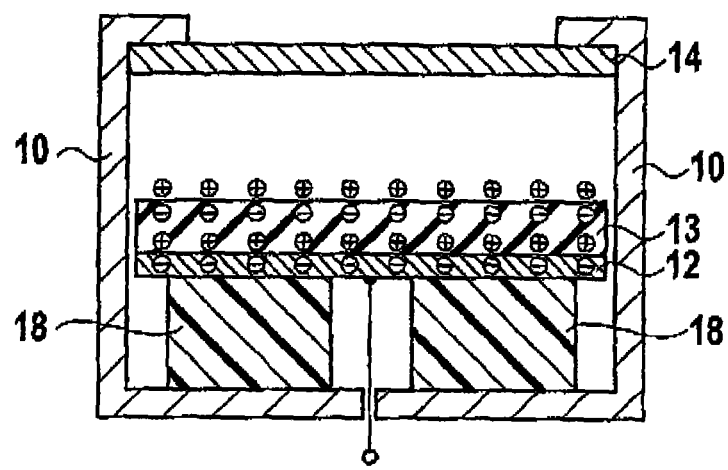
FIG. 11 is a diagrammatically step sectional view describing a sensibility recovering method of the electro-mechanical transducer (microphone-capsule) according to the fourth embodiment of the present invention.
Figure 11:
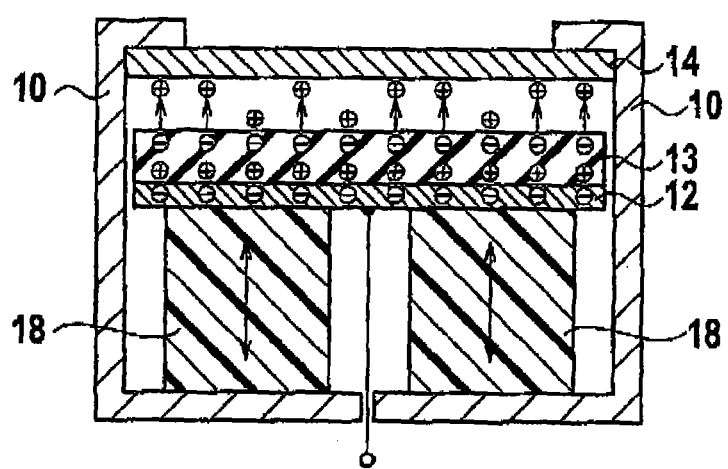
Figure 11:
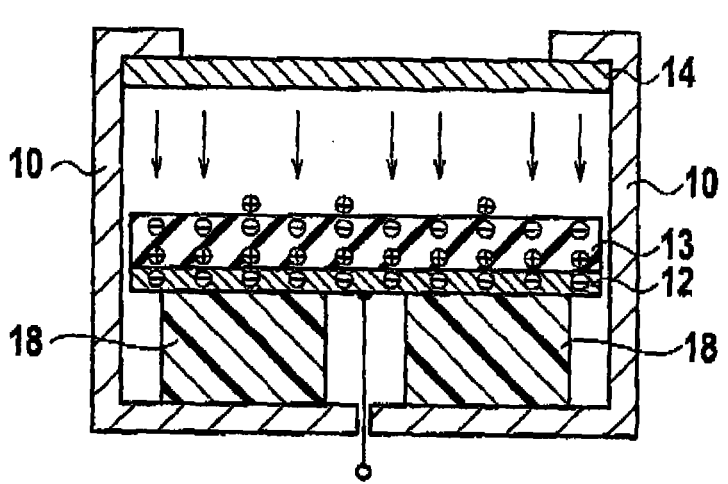

The sensibility recovering method of the electro-mechanical transducer (microphone-capsule) according to the fourth embodiment of the present invention will be described below with reference to FIG. 11.

(a) Similarly to the manufacturing methods of the electro-mechanical transducers according to the first to third embodiments, by the sintering and the like, the circular dielectric-polarization plate 13 having a thickness of 20 to 400 μm is metallurgically connected at a thickness of 0.05 to 100 μm on the circular back electrode 12. Moreover, in such a way that the vibrating plate 14 made of metal (conductor) having a thickness of 10 to 100 μm has the same radius as the dielectric-polarization plate 13, the resin layer 18 having a thickness of 0.1 to 5 mm is cut away so as to have a radius that is slightly smaller than the radius of the dielectric-polarization plate 13. The wiring through hole is formed in the center of the resin layer 18. The output lead (wiring) is connected to the center of the back electrode 12, through high melting point solder and the like. As for the melting point of the high melting point solder, the type having the value higher than the Curie temperature of the dielectric-polarization plate 13 is selected. Then, in such a way that the output lead (wiring) is guided through the wiring through hole on the center of the resin layer 18 to a hole provided at the center of the bottom surface of the conductive (metallic) case 10, as shown in FIG. 10, the vibrating plate 14, the dielectric-polarization plate 13, the back electrode 12 and the resin layer 18 are accommodated in the conductive (metallic) case 10. Simultaneously, similarly to the manufacturing method of the electro-mechanical transducers according to the first to third embodiments, the dielectric-polarization plate 13 is heated to the charge-neutralization temperature of the dielectric-polarization plate 13 that is predetermined in a range between the depolarization temperature and the Curie temperature, and the surface charges on the surface of the dielectric-polarization plate 13 are removed (neutralized), and while the dielectric-polarization plate 13 is heated, the dielectric-polarization plate 13 is assembled into the conductive (metallic) case 10, and the microphone-capsule shown in FIG. 10 is completed.

(b) Now, let us suppose that during the use of the completed microphone-capsule, by the excessive sound pressure, the trouble such as the discharging in the gap between the vibrating plate 14 and the dielectric-polarization plate 13 or the contact between the vibrating plate 14 and the dielectric-polarization plate 13 or the like is generated, thereby charging the surface of the dielectric-polarization plate 13, as shown in FIG. 11(a), so as to drop the sensibility. In the sensibility recovering method of the microphone-capsule according to the fourth embodiment, in this case, the microphone-capsule is re-heated to the predetermined charge-neutralization temperature of the dielectric-polarization plate 13. When the microphone-capsule is re-heated, simultaneously with the decrease in the remanent polarization of the dielectric-polarization plate 13, as shown in FIG. 11(b), the resin layer 18 is expanded, and the interval of the gap between the vibrating plate 14 and the dielectric-polarization plate 13 is reduced, and the discharging is generated in the gap between the vibrating plate 14 and the dielectric-polarization plate 13. Thus, the charges on the surface of the dielectric-polarization plate 13 are decrease.

(c) After that, when the microphone-capsule is cooled to room temperature, as shown in FIG. 11(c), the resin layer 18 contracts so that the interval of the gap between the vibrating plate 14 and the dielectric-polarization plate 13 increase, and the polarization state is returned.

In this way, according to the sensibility recovering method of the microphone-capsule pertaining to the fourth embodiment, it is possible to recover the sensibility of the microphone-capsule, which is once dropped for some reason.

Fifth Embodiment

In the first to fourth embodiments, the microphone-capsule has been described. However, the electro-mechanical transducer of the present invention is not limited to the microphone-capsule, and the electro-mechanical transducer can be applied to the various sensors for detecting mechanical vibrations. In the fifth embodiment of the present invention, an acoustic emission (AE) sensor or detecting an acoustic emission (emission of sound) is described as one example of the sensor for detecting such various mechanical vibrations. The AE implies the phenomenon in which the sound generated when a solid is deformed or broken is emitted as an elastic wave. Then, if the measurement target of the AE is flat and conductive, without any vibrating plate, the elastic wave can be detected by the electro-mechanical transducer according to the fifth embodiment of the present invention and can be nondestructively evaluated.

Figure 12:
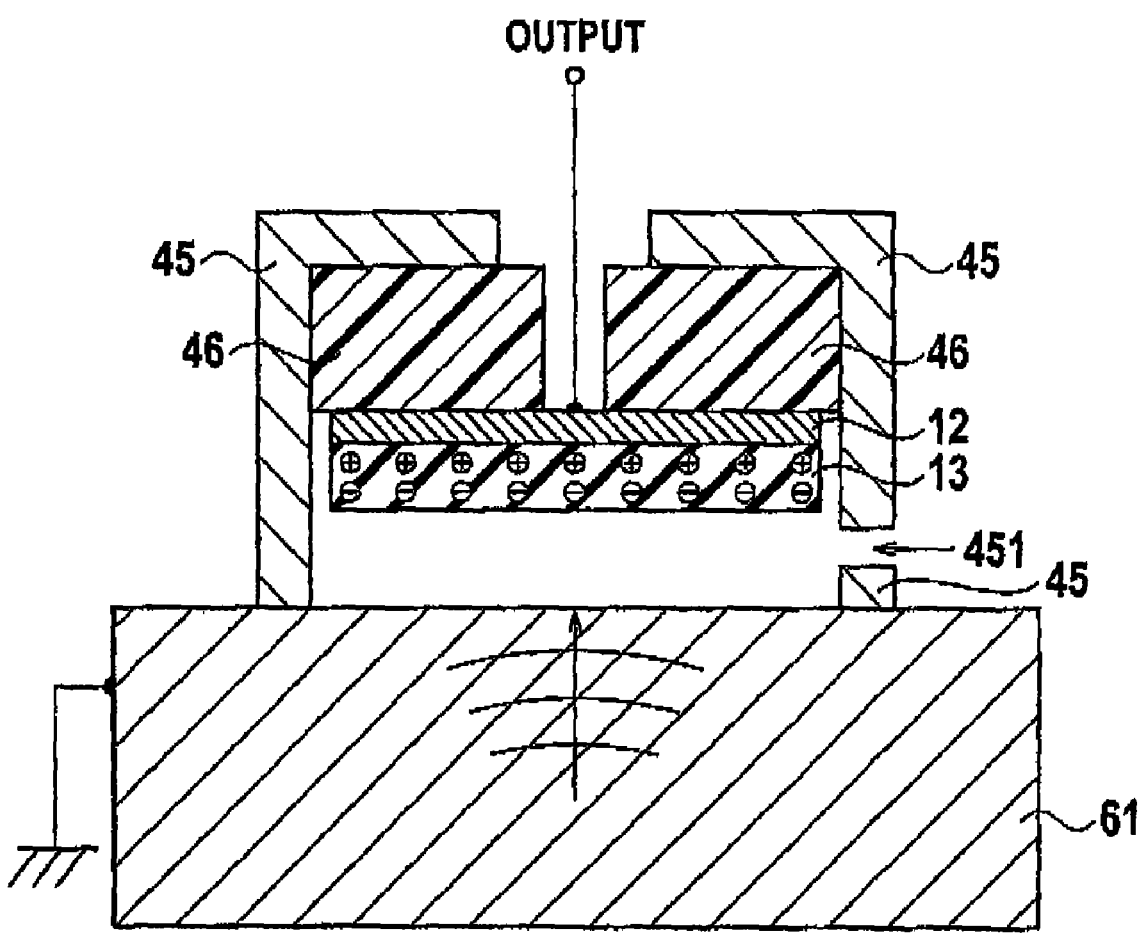
FIG. 12 is a diagrammatically sectional view describing a schematic configuration of an electro-mechanical transducer (AF sensor) according to a fifth embodiment of the present invention.

That is, as shown in FIG. 12, an electro-mechanical transducer according to a fifth embodiment of the present invention is an AE sensor that contains: a vibrator (measurement target) 61 implemented by a conductor having a flat vibration surface; a dielectric-polarization plate 13 which is sandwiched between a flat first principal surface facing to the measurement target 61 and a second principal surface facing parallel to the first principal X) surface and in which the polarization directions are arrayed; a back electrode 12 joined to the second principal surface of the dielectric-polarization plate 13; a cylindrical resin layer 46 which is arranged on the back electrode 12 and has a wiring through hole in a center; and a conductive (metallic) case 45 in which a lower end surface (open end) is connected to the measurement target 61 and also the dielectric-polarization plate 13, the back electrode 12 and the resin layer 46 are accommodated therein. Under no load, the first principal surface of the dielectric-polarization plate 13 faces parallel to the vibration surface of the measurement target 61. In the structure of the AE sensor shown in FIG. 12, the output lead (wiring) connected to the center of the back electrode 12 corresponds to "induced-charge measuring unit configured to measure charges induced by displacement of vibration surface". The external circuit (not shown) is connected to the output terminal of the output lead (wiring), and the signal process necessary for the AE sensor is carried out by the external circuit. In the structure of the AE sensor according to the fifth embodiment shown in FIG. 12, the potential between the back electrode 12 and the measurement target 61 is directly fed out, thereby measuring the charges induced onto the dielectric-polarization plate 13, in association with the displacement of the vibration surface of the vibrating plate 14.

A hole 451 is formed in the conductive (metallic) case 45 such that the hole 451 is opened when the AE sensor is assembled, while the hole 451 can be sealed off when the AE sensor is used (operating). When the AE sensor according to the fifth embodiment shown in FIG. 12 is heated in the state that the hole 451 is opened at the time of assembling, the thermal expansion of the resin layer 46 on the top surface of the back electrode 12 causes the dielectric-polarization plate 13 to be brought into contact with the measurement target 61, and the surface charges are neutralized. After the AE sensor is cooled, the hole 451 is buried. However, in the case of the measurement in a high vacuum state, after the AE sensor is placed in the vacuum environment, the AE sensor is only heated, and the hole 451 is not required to be buried.

According to the AE sensor according to the fifth embodiment, without any drop in the sensibility, the insulation can be achieved between the dielectric-polarization plate 13 and the measurement target 61. Thus, there is no anxiety of corrosion. In particular, in the measurement in the vacuum state, the dielectric breakdown strength in the vacuum state is high. Thus, the excellent sensibility can be obtained.

The amplifier (FET) 21 and the output circuit 9 that are used in the electro-mechanical transducers according to the first to third embodiments are omitted in the electro-mechanical transducer according to the fifth embodiment. However, similarly to the electro-mechanical transducers according to the first to third embodiments, the amplifier (FET) 21 and the output circuit 9 may be used to implement "induced-charge measuring unit".

Although the illustrations on a plan view and a bird's eye view are omitted, each of the dielectric-polarization plate 13 and the back electrode 12 in the AE sensor shown in FIG. 12 has the shape of the circular plate.

AE is generated in association with the generation and progression of a small deformation or micro crack far in advance of leading to destruction. Thus, the defect and destruction of the measurement target 61 can be discovered, estimated and observed in real time by applying a load to the measurement target 61 in the state shown in FIG. 12 and knowing the generation behavior of the AE caused by the application of the load. Thus, the AE sensor according to the fifth embodiment can be applied to the inspection and test of various products, the safety monitor of a structural body, and the new material development and the like.

Of course, similarly to the electro-mechanical transducers according to the first to third embodiments, when an insulating gas or fluid is filled in the gap space between the dielectric-polarization plate 13 and the measurement target 61, the dielectric breakdown strength of the gap space is further increased, which makes the generation of the discharge difficult. As a result, the charge quantity on the surface of the dielectric-polarization plate 13, which is adsorbed by discharging, can be decreased, thereby improving the sensibility. Moreover, in order to further protect the discharging between the measurement target 61 and the dielectric-polarization plate 13, the insulating coat film 33 may be formed on the side of the dielectric polarization plate 13, as explained in the electro-mechanical transducer according to the third embodiment.

Also, the vibration of the measurement target surface caused by the AE is small. Thus, even if the gap space is filled with the material that is excellent in insulating property and has an acoustic impedance equal to or less than that of the measurement target, such as fluorocarbon polymers, polyethylene and the like, the measuring of the AE is valid. In this case, even if the gap space is filled, because the vibration of the measurement target surface is only reduced to about half, at most, on the other hand, since the dielectric breakdown strength can be greatly increased, the great improvement of the sensibility can be expected.

Moreover, when the material whose attenuation is great is filled in the gap, it is possible to suppress the resonance of the gap and the ferroelectric material that is caused by the sound. The ultrasonic sensor using the piezoelectric effect has a problem that the resonance causes a measurement frequency band to be narrow. Because the sensor shown in FIG. 12 can be used also as the ultrasonic sensor, the suppression of the resonance enables the measurement of the ultrasonic wave by the piezoelectric effect in a super wide band (for example, between 100 and 1 MHz).

The other configurations and features, such as the configuration in a which the single-crystalline or poly-crystalline ferroelectric ceramic and some crystalline high polymer and the like can be mainly employed for the dielectric-polarization plate 13 in the electro-mechanical transducer according to the fifth embodiment are substantially similar to those of the electro-mechanical transducers according to the first to fourth embodiments. Thus, the duplex explanations are omitted.

Sixth Embodiment

Such as the AE sensor described in the fifth embodiment, electro-mechanical transducers of the present invention are not limited to the microphone-capsules described in the first to fourth embodiments, and the electro-mechanical transducer can be applied as various sensors for detecting the mechanical vibrations. In a sixth embodiment of the present invention, an acceleration sensor is described as one example of such various sensors for detecting the mechanical vibrations.

Figure 13:
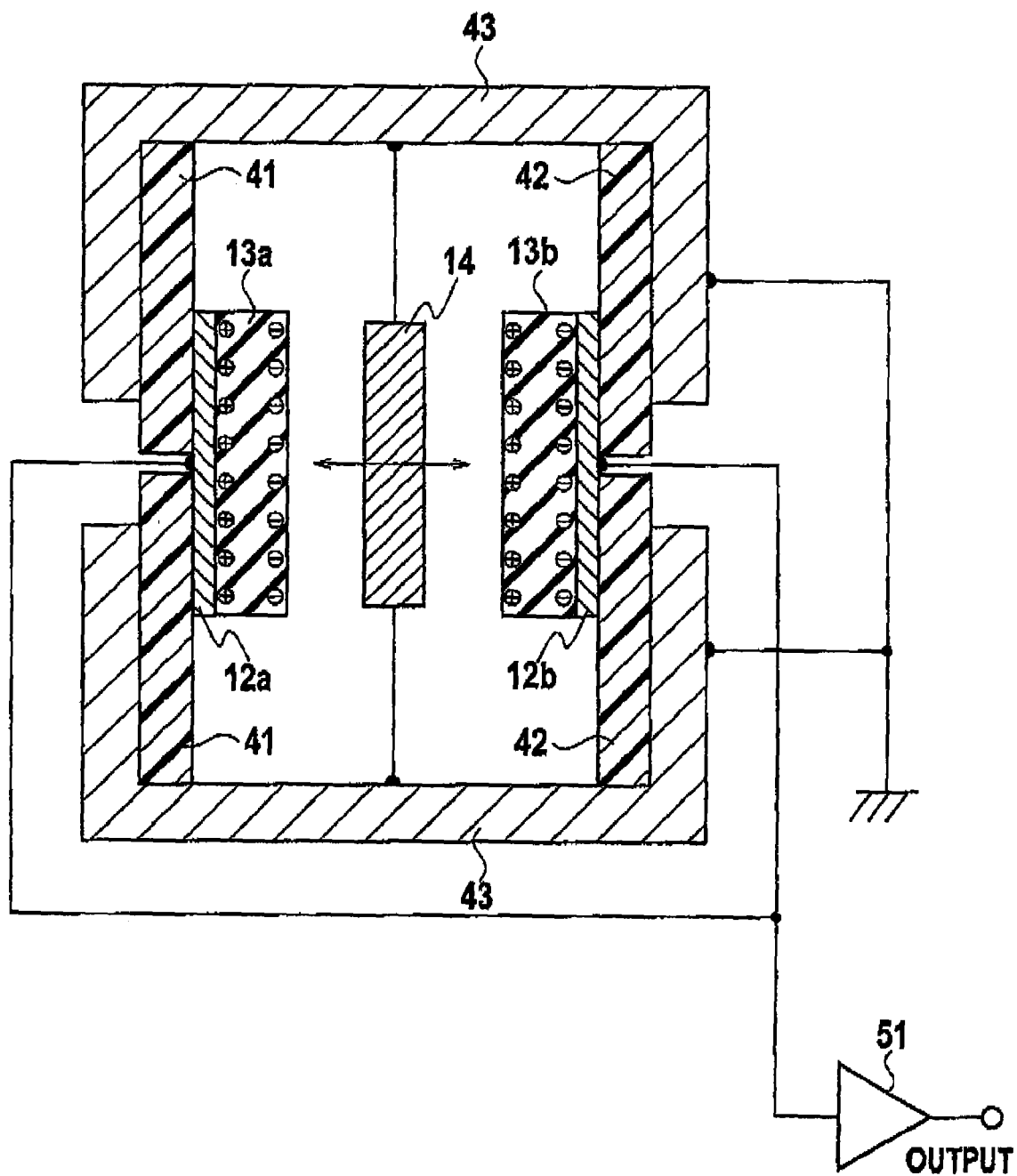
FIG. 13 is a diagrammatically sectional view describing a schematic configuration of an electro-mechanical transducer (acceleration sensor) according to a sixth embodiment of the present invention.

That is, as shown in FIG. 13, an electro-mechanical transducer according to the sixth embodiment of the present invention is the acceleration sensor that contains: a conductive (metallic) case 45; a vibrator (vibrating plate) 14 which is suspended as a weight in the center of the case 45 and is implemented by a conductor having flat vibration surfaces on both surfaces; a first dielectric-polarization plate 13a which faces to the left surface of the vibrating plate 14 as the weight and sandwiched between a flat first principal surface and a second principal surface facing parallel to the first principal surface and in which polarization directions are aligned; a first back electrode 12a joined to the second principal surface of the first dielectric-polarization plate 13a; a cylindrical first resin layer 41 arranged on the left of the first back electrode 12a; a second dielectric-polarization plate 13b which faces to the right surface of the vibrating plate 14 as the weight and sandwiched between a flat first principal surface and a second principal surface facing parallel to the first principal surface and in which polarization directions are aligned; a second back electrode 12b joined to the second principal surface of the second dielectric-polarization plate 13b; and a cylindrical second resin layer 42 arranged on the right of the second back electrode 12b. That is, the vibrating plate 14, the first dielectric-polarization plate 13a, the second dielectric-polarization plate 13b, the first back electrode 12a, the second back electrode 12b, the first resin layer 41 and the second resin layer 42 are accommodated in the inside of the conductive (metallic) case 45. Under no load, the first principal surface of the first dielectric-polarization plate 13a faces parallel to the left surface (vibration surface) of the vibrating plate 14, and the first principal surface of the second dielectric-polarization plate 13b faces parallel to the right surface (vibration surface) of the vibrating plate 14.

As shown in FIG. 13, the first dielectric-polarization plate 13a and the second dielectric-polarization plate 13b are polarized in the same direction. However, when the first dielectric-polarization plate 13a and the second dielectric-polarization plate 13b are viewed from the vibrating plate 14, the polarization directions of the first dielectric-polarization plate 13a and the second dielectric-polarization plate 13b are opposite. Thus, outputs having the same polarity are provided for the right and left vibrations of the vibrating plate 14. For example, when the vibrating plate 14 is displaced in the left direction, the vibrating plate 14 moves close to the dielectric-polarization plate 13a. Thus, a positive output is obtained from the back electrode 12a. Here, the vibrating plate 14 moves away from the dielectric-polarization plate 13b. However, when first dielectric-polarization plate 13a and the second dielectric-polarization plate 13b are viewed from the vibrating plate 14, the polarization direction of the dielectric-polarization plate 13b is opposite to the direction of the dielectric-polarization plate 13a. Thus, the positive output is also obtained from the dielectric-polarization plate 13b. In this way, since the first dielectric-polarization plate 13a and the second dielectric-polarization plate 13b provide a couple of outputs having the same polarity, the outputs from the first dielectric-polarization plate 13a and the second dielectric-polarization plate 13b are passed through the first back electrode 12a and the second back electrode 12b, respectively, and then collected and entered to the same amplifier 51. In the electro-mechanical transducer according to the sixth embodiment shown in FIG. 13, the amplifier 51 serves as "induced-charge measuring unit configured to measure charges induced by displacement of vibration surface". The external circuit (not shown) is connected to the output terminal of the amplifier 51, and the external circuit carries out the signal process necessary for the acceleration sensor. In the configuration of the acceleration sensor according to the sixth embodiment shown in FIG. 13, the amplifier 51 superimposes and amplifies the potential between the first back electrode 12a and the vibrating plate 14 and the potential between the second back electrode 12b and the vibrating plate 14. Thus, in association with the displacement of the vibration surface of the vibrating plate 14, the charges induced onto the first dielectric-polarization plate 13a and the second dielectric-polarization plate 13b are measured.

Although the illustrations on a plan view and a bird's eye view are omitted, each of the vibrating plate 14, the first dielectric-polarization plate 13a, the second dielectric-polarization plate 13b, the first back electrode 12a and the second back electrode 12b in the acceleration sensor shown in FIG. 13 has the shape of the circular plate.

Of course, similarly to the electro-mechanical transducers according to the first to third embodiments, when an insulating gas or fluid is filled in the gap space between the first dielectric-polarization plate 13a and the vibrating plate 14 and the gap space between the second dielectric-polarization plate 13b and the vibrating plate 14, the dielectric breakdown strengths in the gap spaces are further increased, which makes the generation of the discharge difficult. As a result, the charge quantities on the surfaces of the first dielectric-polarization plate 13a and the second dielectric-polarization plate 13b, which are adsorbed by the discharging, can be decreased, thereby improving the sensibility. Moreover, in order to protect the dischargings between the vibrating plate 14 and the first dielectric-polarization plate 13a and the discharging between the vibrating plate 14 and the second dielectric-polarization plate 13b, the insulating coat films 32 may be formed on both right and left surfaces of the vibrating plate 14, as described in the electro-mechanical transducer according to the second embodiment, or the insulating coat films 33 may be formed on the sides of the first dielectric-polarization plate 13a and the second dielectric-polarization plate 13b, respectively, as explained in the electro-mechanical transducer according to the third embodiment.

The other configurations and features, such as the configuration in which the single-crystalline or poly-crystalline ferroelectric ceramic and some crystalline high polymer and the like can be mainly employed for the first dielectric-polarization plate 13a and the second dielectric-polarization plate 13b in the electro-mechanical transducer (acceleration sensor) according to the sixth embodiment are substantially similar to those of the electro-mechanical transducers according to the first to fifth embodiments. Thus, the duplex explanations are omitted.

Acceleration sensors of the earlier technology have a fear that the sensors may be damaged, because a load is applied to the piezoelectric element. However, according to the electro-mechanical transducer (acceleration sensor) according to the sixth embodiment, the member vibrated by the generation of the acceleration is only the vibrating plate 14 located in the center. Since the first dielectric-polarization plate 13*a* and the second dielectric-polarization plate 13*b* do not substantially receive the load, the durability of the electro-mechanical transducer (acceleration sensor) is improved.

<Modification of Sixth Embodiment>

Figure 14:
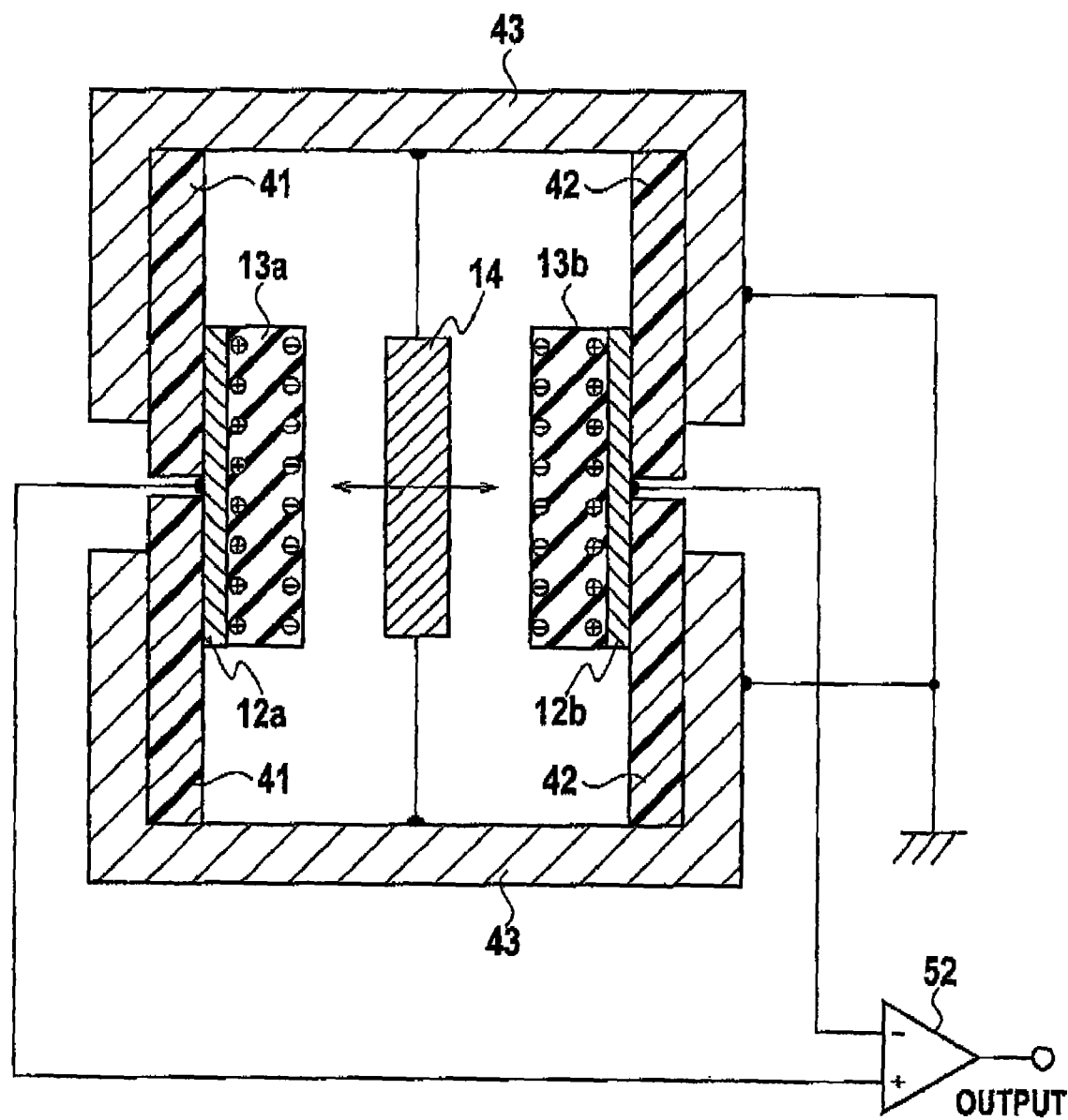
FIG. 14 is a diagrammatically sectional view describing a schematic configuration of an electro-mechanical transducer (acceleration sensor) according to a modification of the sixth embodiment of the present invention.

As shown in FIG. 14, the electro-mechanical transducer according to a modification of the sixth embodiment of the present invention is similar to the electro-mechanical transducer according to the sixth embodiment shown in FIG. 13, with regard to the acceleration sensor that contains: a conductive (metallic) case 45; a vibrator (vibrating plate) 14 which is suspended as the weight in the center of the case 45 and is implemented by the conductor having the flat vibration surfaces on both surfaces; a first dielectric-polarization plate 13*a* which faces to the left surface of the vibrating plate 14 as the weight and sandwiched between a flat first principal surface and a second principal surface facing parallel to the first principal surface and in which the polarization directions are aligned; a first back electrode 12*a* joined to the second principal surface of the first dielectric-polarization plate 13*a*; a cylindrical first resin layer 41 arranged on the left of the first back electrode 12*a*; a second dielectric-polarization plate 13*b* which faces to the right surface of the vibrating plate 14 as the weight and sandwiched between a fiat first principal surface and a second principal surface facing parallel to this first principal surface and in which the polarization directions are aligned; a second back electrode 12*b* joined to the second principal surface of the second dielectric-polarization plate 13*b*; and a cylindrical second resin layer 42 arranged on the right of the second back electrode 12*b*.

However, as shown in FIG. 14, the configuration in which, since the first dielectric-polarization plate 13*a* and the second dielectric-polarization 3 plate 13*b* are polarized with polarities opposite to each other, the outputs from the first dielectric-polarization plate 13*a* and the second dielectric-polarization plate 13*b* are entered through the first back electrode 12*a* and the second back electrode 12*b*, respectively, to a non-inverting input terminal (positive terminal) and an inverting input terminal (negative terminal of a differential amplifier 52, respectively, so that the outputs are differentially amplified is a feature that is different from the electro-mechanical transducer according to the sixth embodiment shown in FIG. 13. In the electro-mechanical transducer according to the modification of the sixth embodiment shown in FIG. 14, the differential amplifier 52 serves as "induced-charge measuring unit configured to measure charges induced by displacement of vibration surface". The external circuit (not shown) is connected to the output terminal of the differential amplifier 52, and the signal process necessary for the acceleration sensor is carried out by the external circuit. In the configuration of the acceleration sensor according to the modification of the sixth embodiment shown in FIG. 14, the differential amplifier 52 differentially amplifies a potential between the first back electrode 12*a* and the vibrating plate 14 and a potential between the second back electrode 12*b* and the vibrating plate 14. Thus, in association with the displacement of the vibration surface of the vibrating plate 14, the charges induced onto the first dielectric-polarization plate 13*a* and the second dielectric-polarization plate 13*b* are measured.

The other configurations are substantially similar to those of the electro-mechanical transducer according to the sixth embodiment shown in FIG. 13. Thus, the duplex explanations are omitted.

Seventh Embodiment

In the first and second embodiments of the present invention, once the discharging is generated in the gap space between the vibrator (vibrating plate) 14 and the dielectric-polarization plate 13, the surface of the dielectric-polarization plate 13 is again charged to some degree. Thus, the excellent polarization property of the ferroelectric material cannot be sufficiently exhibited. However, when the charges generated by the discharging are not adsorbed on the vibration surface and the charges remain in the gap space, it is possible to protect the deterioration in the sensibility.

Figure 15:
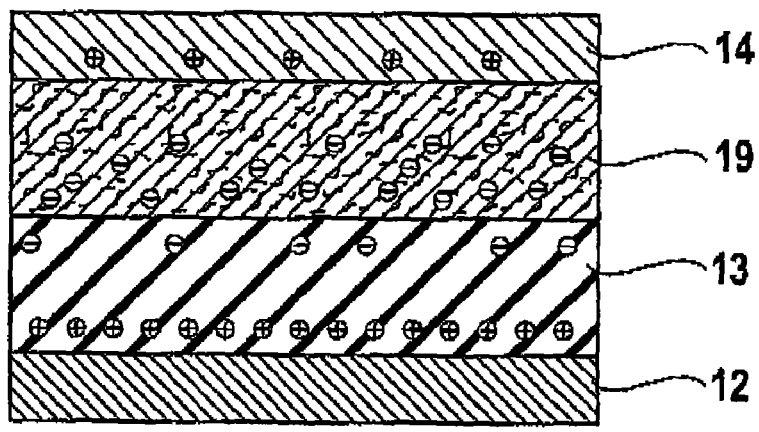
FIG. 15 is a diagrammatically sectional view describing a schematic configuration of an electro-mechanical transducer according to a seventh embodiment of the present invention.

As FIG. 15 shows an example, in an electro-mechanical transducer according to a seventh embodiment of the present invention, a gap-filling layer 19 that includes at least one of a fibrous layer and a porous layer is filled in the gap space. The fibrous layer or the porous layer is preferably the substance, which is liable to be charged negative and is superior in insulating property, such as fluorocarbon polymers, polyethylene and the like.

When the surface of the ferroelectric material facing to the vibrating plate 14 is negatively charged by the polarization, if discharging is generated in the gap space between the vibrating plate 14 and the dielectric-polarization plate 13, the positive charges generated by the discharging are adsorbed on the surface of the dielectric-polarization plate 13. Then, even if the negative charges generated by the polarization are canceled by positive charges generated by the discharging, if the gap-fling layer 19 is embedded in the gap space, because the negative charges generated by the discharging will remain in the gap-filling layer 19, the electric field in the gap space is kept. Thus, the electric field higher than the dielectric breakdown strength of the air can be kept in the gap space. On the other hand, since the gap-filling layer 19 is embedded in the gap space, the vibrating plate 14 is difficult to deform, as compared with a gap apace in which only air exists. Hence, material of the gap-filling layer 19 shall be designed such that the increase of the sensibility caused by an increase of the gap electric field can exceed the drop of the sensibility caused by a suppression of deformation of the vibrating plate 14.

Since the other configurations are substantially similar to those of the electro-mechanical transducers according to the first and second embodiments, the duplex explanations are omitted.

Eighth Embodiment

As a piezoelectric sensor can operate as an actuator when an inverse piezoelectric effect is used, an electro-mechanical transducer of the present invention can be also operated as the actuator.

Figure 16:
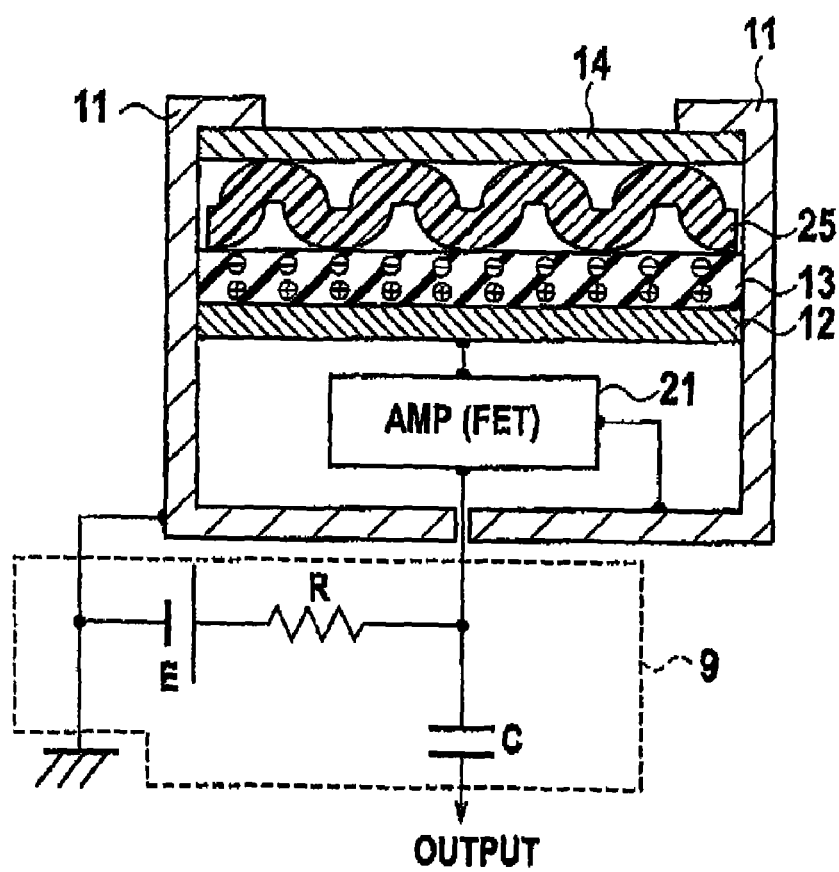
FIG. 16 is a diagrammatically sectional view describing a schematic configuration of an electro-mechanical transducer (actuator) according to an eighth embodiment of the present invention.

FIG. 16 shows the example of the actuator (electro-mechanical transducer) according to an eighth embodiment of the present invention. FIG. 16 shows the electro-mechanical transducer in which an insulating film 25 whose surface is rough is formed on a surface of a dielectric-polarization plate 13 from which surface charges are removed, and the actuator according to the eighth embodiment is an example into which the second and third embodiments are combined. As the insulating film 25 whose surface is rough, fluorocarbon-polymer film is preferable. The surface roughness of the insulating film 25 is preferably the arithmetic mean roughness defined in JISB 0601-1994, namely, Ra=about 0.01 to 100 µm, and the further preferable arithmetic mean roughness, namely, Ra is about 0.1 to 1 µm. The configurations other than the feature that the actuator embraces the insulating film 25 are substantially similar to those of the electro-mechanical transducers according to the second and third embodiments. Thus, the duplex explanations are omitted.

Figure 17:
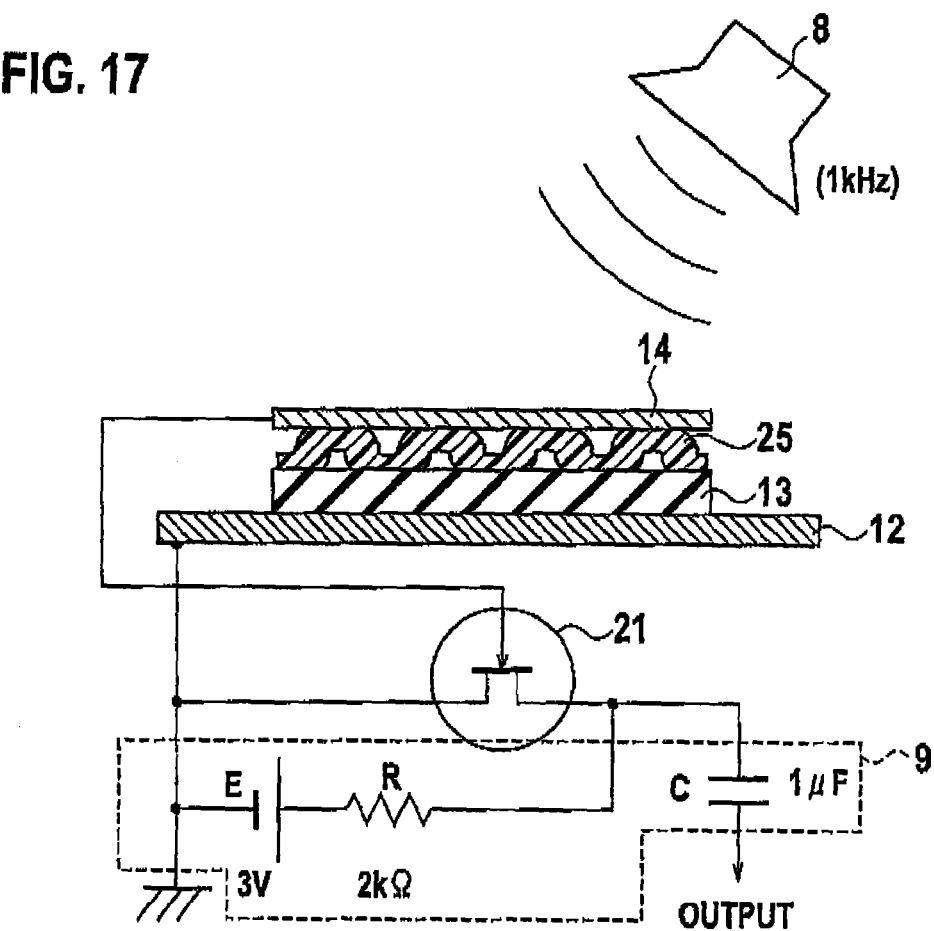
FIG. 17 is a diagrammatic view showing a manner when sound is given from a speaker to a vibrating plate of the electro-mechanical transducer according to the eighth embodiment of the present invention.

In the actuator according to the eighth embodiment, as shown in FIG. 17, when the vibrating plate 14 receives the sound from a speaker 8, the air gap generated by the convex/concave on the surface of the insulating film 25 is deformed, and the vibration is converted into an electric signal. On the other hand, when a voltage is inversely applied between the back electrode 12 and the vibrating plate 14, the electric force which is applied to the vibrating plate 14 on the basis of the electric field of the gap space is changed, which can move the vibrating plate 14.

Figure 18:
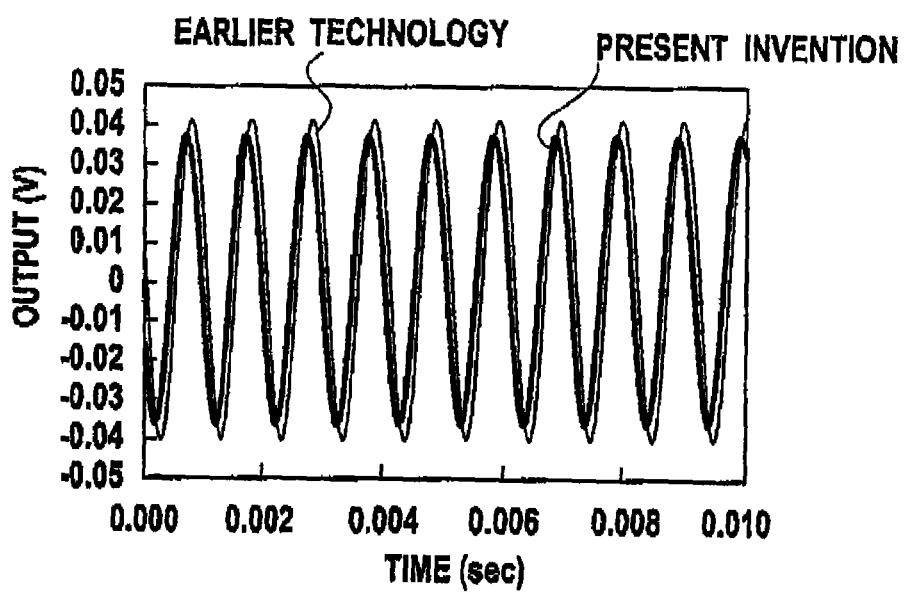
FIG. 18 is a view showing an output when the actuator shown in FIG. 17 is used to give the sound of 1 kHz from the speaker, as compared with a commercially available microphone according to an earlier technology.

FIG. 18 is the example in which the actuator shown in FIG. 17 is used to measure the sound of 1 kHz from the speaker 8. A trial microphone is known to have the sensibility similar to that of the commercially available microphone (the sensibility—45 dB) produced by an earlier technology.

Figure 19:
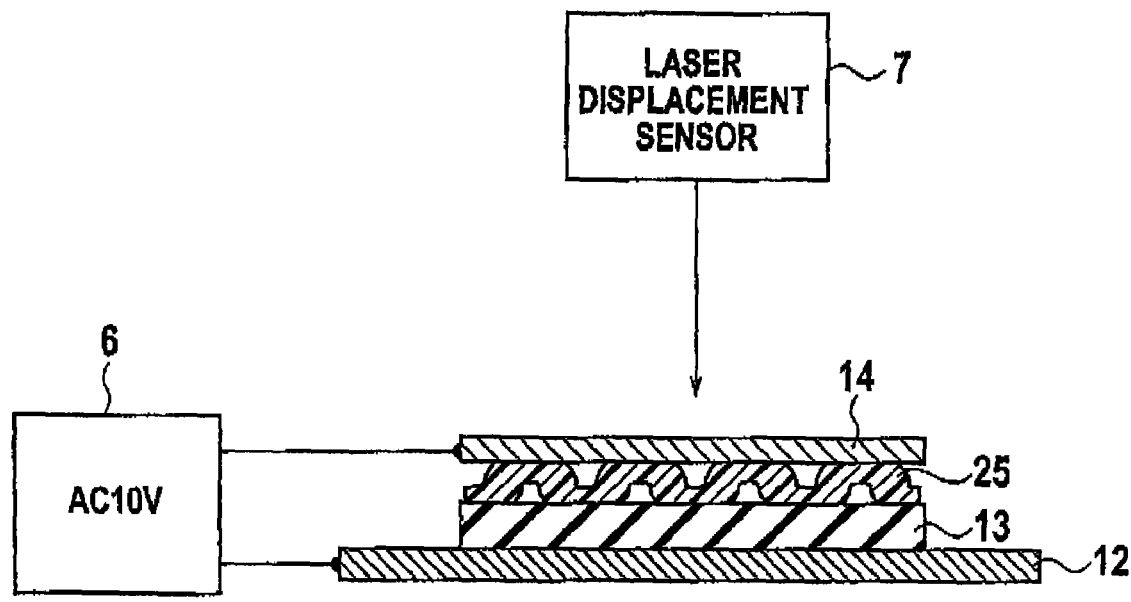
FIG. 19 is a diagrammatic view showing a manner in which, when an alternating voltage is applied from an alternating power supply to the actuator according to the eighth embodiment, a displacement of the vibrating plate is measured by using a laser displacement indicator.
Figure 20:
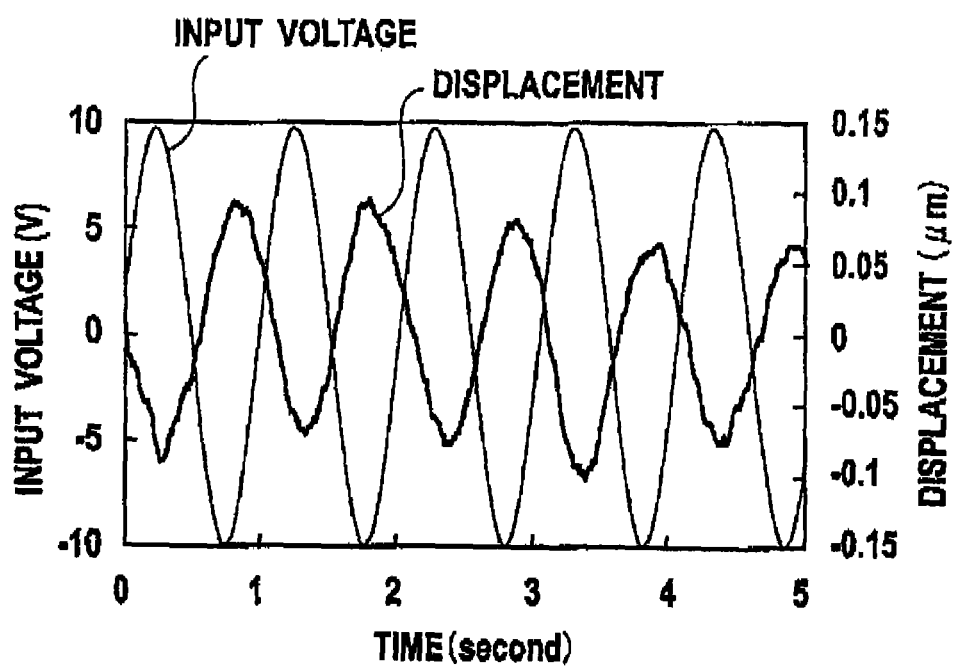
FIG. 20 is a view showing a relation between an input voltage and the displacement obtained by using the measuring system shown in FIG. 19.

On the other hand, FIG. 20 shows a result in which as shown in FIG. 19, when an alternating voltage of 10 V is applied from an alternating power supply 6 to the actuator and then the displacement of the vibrating plate 14 is measured by a laser displacement sensor 7. From FIG. 20, it is known that even a low voltage of 10 V enables displacements of 100 nm or more to be obtained and the electro-mechanical transducer is also operated as the actuator. Incidentally, in the case of a commercially available piezoelectric actuator having the same shape (a thickness of 2 mm), even if an alternating voltage of 10 V is applied, only displacements of 7 nm or less can be obtained.

In the actuator according to the eighth embodiment, although the generated force is greatly weak than that of the piezoelectric ceramic, a large displacement can be obtained in air. By using the feature of large displacement, in a single device of the electro-mechanical transducer, the single device can be used not only as the actuator but also as the speaker. When the material whose attenuation is great is used in the gap so that the resonance is suppressed, the electro mechanical transducer according to the eighth embodiment can be operated in a very wide frequency band (for example, between 100 and 1 MHz).

Also, the actuator according to the eighth embodiment generates the displacement greater than that of the piezoelectric ceramic, even for soft material such as material dipped in water or a living body. In short, the electro-mechanical transducer according to the eighth embodiment can be used as a ultrasonic probe for detecting a ultrasonic wave that is reflected or transmitted when the ultrasonic wave is emitted to the foregoing soft material. In this case, similarly to the speaker, when the material whose attenuation is great is used in the gap so that the resonance is suppressed, the electro-mechanical transducer according to the eighth embodiment can be operated in a very wide frequency band (for example, between 10 k and 10 MHz).

Other Embodiments

As mentioned above, the present invention has been described by using the first to eighth embodiments. However, the discussions and drawings that constitute a part of this disclosure should not be understood to limit the present invention. From this disclosure, the various implementations, variations, embodiments and operational techniques may be evident for one skilled in the art.

For example, in the first to eighth embodiments, a case of using the dielectric-polarization plate 13 in which the polarization quantity becomes maximal at room temperature is exemplified. However, as described in the first embodiment, in ferroelectric materials of mixed crystals including ternary compounds, quaternary compounds or multinary compounds encompassing more than five elements such as perovskite compounds, by controlling the composition of the compound, the temperature at which polarization quantity becomes maximal can be changed. Thus, contrary to the electro-mechanical transducers described in the first to eighth embodiments, charged particles may be intentionally adsorbed by heating and cooling. For example, in a case that ferroelectric material designed to have a maximal polarization quantity at temperature close to 200° C. is attached to a back electrode 12 and then heated at 200° C. so as to assemble an electro-mechanical transducer, charged particles may be adsorbed on a surface of the ferroelectric material at 200° C., then, if electro-mechanical transducer is cooled to room temperature, the polarizations of the dielectric-polarization plate 13 will distinguish. Thus, at room temperature, in a state that charged particles on the surface of the dielectric-polarization plate 13 are neutralized, it is also possible to measure the charged state between the electrodes induced by vibration of the vibrator.

In particular, if ferroelectric material having a high Curie temperature is heated to a temperature close to the Curie temperature so as to manufacture an electro-mechanical transducer, the electro-mechanical transducer can be used even at higher temperature closed to the Curie temperature. Thus, the electro-mechanical transducer having a heat-resistance property can be fabricated.

In this way, the present invention may naturally include various embodiments not described herein. Therefore, the technical scope of the present invention should be defined only by subject matters for specifying the invention prescribed by appended claims, which can be regarded appropriate according to the above description.

INDUSTRIAL APPLICABILITY

The electro-mechanical transducer of the present invention can be used in the field of the audio equipment as a super wide band microphone, or a measuring equipment as a super wide band audio sensor and a super wide band ultrasonic sensor, corresponding to sound pressures and frequencies in a wide range, because even if the rigidity of the vibrator (vibration surface) is made higher than that of electro-mechanical transducers of earlier technology, an equivalent sensibility can be obtained, and by embedding material having a high attenuation in the gap space, the resonance can be suppressed.

In particular, in the field of the audio equipment, the electro-mechanical transducer of the present invention can be used as a microphone (for example, a super wide band hydrophone) that is superior in sensibility and frequency band than piezoelectric ceramic, even in the measurement of the sound transmitted through a low sound impedance medium such as in the inside of water or living body.

Moreover, the electro-mechanical transducer of the present invention, since the electro-mechanical transducer operates as an actuator, can be used in the field of medical equipment as a medical ultrasonic probe. In particular, in the field of the medical equipment, the electro-mechanical transducer of the present invention can detect at a high sensibility the ultrasonic wave transmitted through a human body, the frequency of the ultrasonic wave changes while the ultrasonic wave propagates in the human body, because the electro mechanical transducer has a wide frequency band.

In any case, even if the sensibility is deteriorated, because the electro-mechanical transducer of the present invention can be easily returned to the initial sensibility by heating, as the piezoelectric effect is not used in the electro-mechanical transducer of the present invention, and because there is no case that the sensibility is severely deteriorated by the connection state between the electrode and the ferroelectric material, the electro-mechanical transducer of the present invention can be used as sensors, actuators and probes whose lives are very long, and the electro-mechanical transducer of the present invention can be used in the field of the electronic equipment and the like, into which the electro-mechanical transducers are incorporated.

The invention claimed is:

1. An electro-mechanical transducer comprising:
   a vibrator implemented by a conductor having a flat vibration surface;
   a first dielectric-polarization plate implemented by ferroelectric material, in which polarization directions are aligned in a same direction, the dielectric-polarization plate being defined by a flat first principal surface facing to the vibration surface and a second principal surface facing parallel to the first principal surface;
   a first back electrode joined to the second principal surface; and
   an induced-charge measuring unit configured to estimate equivalent charges induced on the first dielectric-polarization plate by displacement of the vibration surface, after measuring a potential between the first back electrode and the vibrator, by converting the measured potential into the equivalent charges.

2. The electro-mechanical transducer of claim 1, wherein the ferroelectric material is any one of a single crystalline ferroelectric material, a polycrystalline ferroelectric material and a crystalline high polymer.

3. The electro-mechanical transducer of claim 2, wherein the ferroelectric material is any one of a perovskite compound, a tungsten bronze structure compound, a bismuth-based layer-shaped structure compound, a wurtzite structure crystal, a zinc oxide, a quartz, and a Rochelle salt.

4. The electro-mechanical transducer of claim 1, further comprising an insulating coat film provided on the vibrator.

5. The electro-mechanical transducer of claim 1, further comprising an insulating coat film provided on the first principal surface.

6. The electro-mechanical transducer of claim 1, further comprising a gap-filling layer including at least one of a fibrous layer and a porous layer, the gap-filling layer is embedded in between the vibrator and the dielectric-polarization plate.

7. The electro-mechanical transducer of claim 1, further comprising an insulating film having a rough surface, which is inserted between the vibrator and the dielectric-polarization plate.

8. The electro-mechanical transducer of claim 1, wherein the vibrator, the dielectric-polarization plate and the back electrode are accommodated in a conductive case.

9. The electro-mechanical transducer of claim 1, wherein the dielectric-polarization plate and the back electrode are accommodated in a conductive case, the vibrator is a measurement target for carrying out an acoustic emission, and an opening end of the case is in contact with the measurement target.

10. The electro-mechanical transducer of claim 8, wherein a resin layer is inserted between the back electrode and the case.

11. The electro-mechanical transducer of claim 1, wherein a central surface of opposed two surfaces of the vibrator is defined as a mirror image plane, further comprising:
    a second dielectric-polarization plate allocated at a mirror image position of the first dielectric-polarization plate, with respect to the mirror image plane; and
    a second back electrode having allocated at a mirror image position of the first back electrode, with respect to the mirror image plane,
    wherein the induced-charge measuring unit measures charges induced on the dielectric-polarization plate and the second dielectric-polarization plate.

12. A manufacturing method of an electro-mechanical transducer, comprising:
    on a dielectric-polarization plate implemented by a ferroelectric material, defined by a flat first principal surface and a second principal surface facing parallel to the first principal surface, joining a back electrode on the second principal surface of the dielectric-polarization plate;
    heating the dielectric-polarization plate to a charge-neutralization temperature between a depolarization temperature and the Curie temperature so as to remove charges induced on a surface of the dielectric-polarization plate;
    preparing a vibrator implemented by a conductor having a flat vibration surface, and accommodating the dielectric-polarization plate, the back electrode and the vibrator in a conductive case, at the charge-neutralization temperature so that the first principal surface faces to the vibrator, and then sealing a space between the vibrator and the dielectric-polarization plate; and
    after sealing the space between the vibrator and the dielectric-polarization plate, returning the dielectric-polarization plate to room temperature so as to align polarization directions in a same direction in the ferroelectric material.

* * * * *